(12) United States Patent
Hirata et al.

(10) Patent No.: US 11,190,110 B2
(45) Date of Patent: Nov. 30, 2021

(54) POWER SUPPLY DEVICE

(71) Applicant: OMRON Corporation, Kyoto (JP)

(72) Inventors: Taketomo Hirata, Kusatsu (JP); Takao Ushiyama, Ritto (JP)

(73) Assignee: OMRON Corporation, Kyoto (JP)

( * ) Notice: Subject to any disclaimer, the term of this patent is extended or adjusted under 35 U.S.C. 154(b) by 75 days.

(21) Appl. No.: 16/639,129

(22) PCT Filed: Aug. 24, 2018

(86) PCT No.: PCT/JP2018/031425
§ 371 (c)(1),
(2) Date: Feb. 14, 2020

(87) PCT Pub. No.: WO2019/054160
PCT Pub. Date: Mar. 21, 2019

(65) Prior Publication Data
US 2020/0212819 A1 Jul. 2, 2020

(30) Foreign Application Priority Data

Sep. 15, 2017 (JP) .............................. JP2017-177316

(51) Int. Cl.
*H02M 7/06* (2006.01)
*H02P 7/292* (2016.01)

(52) U.S. Cl.
CPC .............. *H02M 7/06* (2013.01); *H02P 7/292* (2013.01)

(58) Field of Classification Search
CPC ...... H02M 7/06; H02M 5/458; H02M 1/0006; H02M 1/0096; H02M 7/05; H02M 1/4283; H02M 7/08; H02P 7/292; H02P 2201/03
See application file for complete search history.

(56) References Cited

U.S. PATENT DOCUMENTS

| 4,478,315 | A | * | 10/1984 | Nomura | .................... B66B 5/02 |
| | | | | | 187/296 |
| 10,833,611 | B2 | * | 11/2020 | Cox | ......... H02P 6/182 |
| 2007/0063661 | A1 | * | 3/2007 | Galli | ....................... H02M 1/32 |
| | | | | | 318/109 |

FOREIGN PATENT DOCUMENTS

| CN | 204361943 | | 5/2015 | |
| GB | 2256100 | A * | 11/1992 | ................ H02P 3/24 |
| JP | 10337027 | A * | 12/1998 | |
| JP | 2001218476 | | 8/2001 | |
| JP | 2004222447 | | 8/2004 | |
| JP | 2017005837 | | 1/2017 | |
| JP | 2017118646 | | 6/2017 | |

OTHER PUBLICATIONS

"International Search Report (Form PCT/ISA/210) of PCT/JP2018/031425," dated Oct. 2, 2018, with English translation thereof, pp. 1-2.
"Written Opinion of the International Searching Authority (Form PCT/ISA/237) of PCT/JP2018/031425," dated Oct. 2, 2018, with English translation thereof, pp. 1-8.

(Continued)

*Primary Examiner* — Bickey Dhakal
(74) *Attorney, Agent, or Firm* — JCIPRNET

(57) ABSTRACT

A main circuit power source and a control power source of a motor drive device are backed up. A first backup capacitor is inserted between a rectifier and a control power source output terminal that supplies power to a control circuit of a driver.

15 Claims, 8 Drawing Sheets

(56) References Cited

OTHER PUBLICATIONS

"Partial Supplementary Search Report of Europe Counterpart Application", dated Apr. 15, 2021, p. 1-p. 15.
Siemens, "Sinamics S120 Cabinet Modules Manual," retrieved on Mar. 31, 2011, pp. 1-255, URL:<fdocuments.in/document/sinamics-s120-cabinet-modules-siemens-cabinet-modules-manual-gh5-032011.html>.
"Search Report of Europe Counterpart Application", dated Jul. 29, 2021, p. 1-p. 15.

* cited by examiner

POWER SUPPLY DEVICE

CROSS-REFERENCE TO RELATED APPLICATION

This application is a 371 application of the International PCT application serial no. PCT/JP2018/031425, filed on Aug. 24, 2018, which claims the priority benefit of Japan Patent Application No. 2017-177316, filed on Sep. 15, 2017. The entirety of each of the abovementioned patent applications is hereby incorporated by reference herein and made a part of this specification.

BACKGROUND OF THE INVENTION

Technical Field

The present invention relates to a power supply device which supplies power to a motor drive device.

Related Art

Conventionally, a power supply device is known which can stably supply power to a main circuit of a motor drive device such as a servo driver, a servo amplifier or the like even when a sudden change (instantaneous voltage drop, instantaneous power failure, and the like) in input voltage occurs. For example, in patent literature 1 (Japanese Patent Application Laid-Open "Japanese Patent Laid-Open No. 2017-5837 (published on Jan. 15, 2017)), a power conversion device is disclosed in which a capacitor is connected between a positive side output terminal and a negative side output terminal of a rectification circuit and power is supplied to a main circuit of an inverter device.

SUMMARY

Problems to be Solved

However, the conventional technique as described above has a problem that power cannot be supplied to a control circuit of the motor drive device when a sudden change in the input voltage occurs.

One aspect of the present invention aims to achieve a power supply device which can supply power not only to a main circuit of a motor drive device but also to a control circuit of the motor drive device when a sudden change in the input voltage occurs.

Means to Solve Problems

In order to solve the above problem, a power supply device according to one aspect of the present invention supplies power to a main circuit of a motor drive device supplying motor drive power to a motor, and includes: a rectification circuit which rectifies an alternating current input from an external AC power source; and a control power source output terminal which supplies power to a control circuit of the motor drive device controlling the main circuit, wherein (1) a first backup capacitor is inserted between the rectification circuit and the control power source output terminal, and (2) the first backup capacitor is charged by output of the rectification circuit.

Effect

According to one aspect of the present invention, an effect can be exhibited that power can be supplied not only to a main circuit of a motor drive device but also to a control circuit of the motor drive device when a sudden change in the input voltage occurs.

DESCRIPTION OF THE EMBODIMENTS

Embodiment 1

Figure 1:
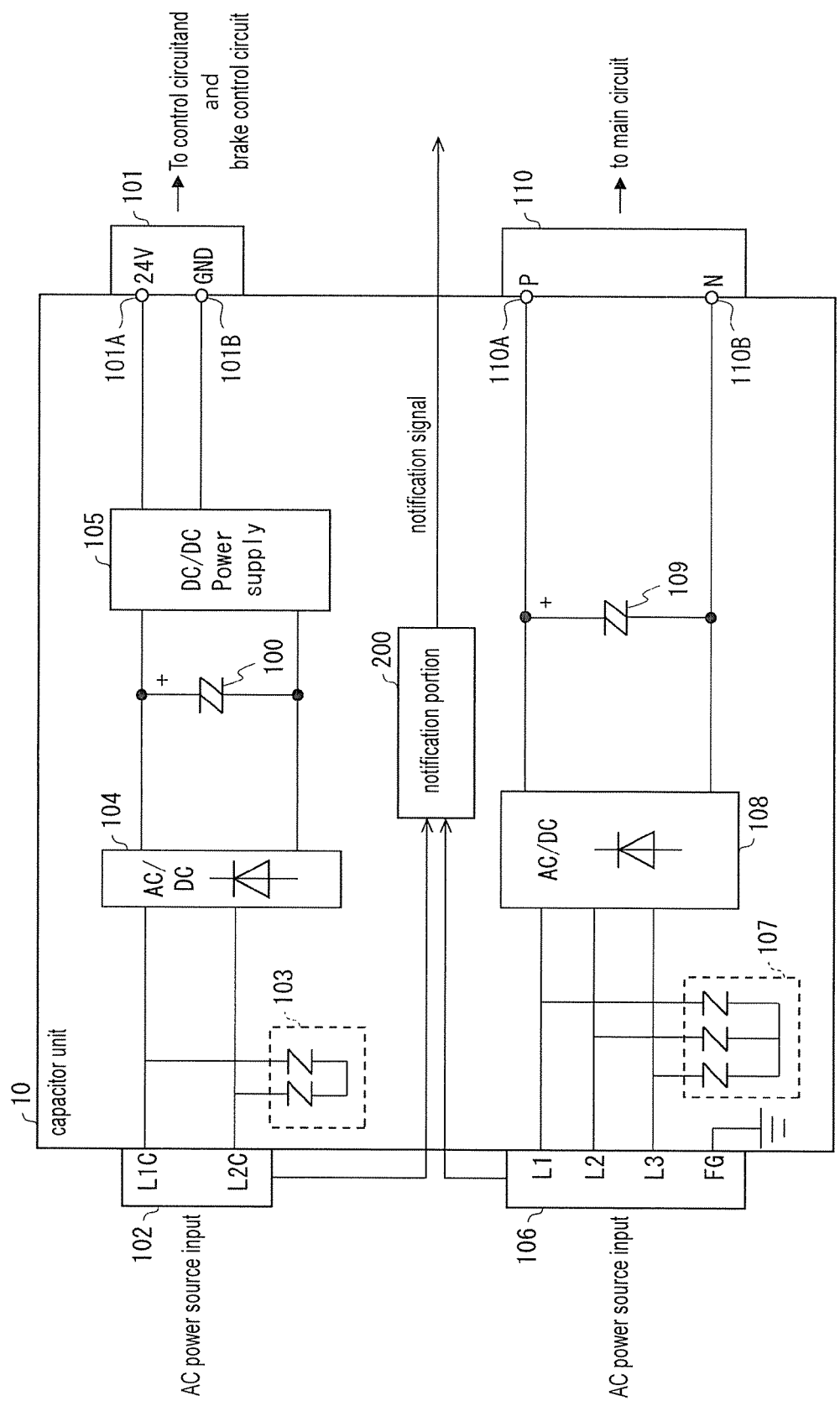
FIG. 1 is a diagram showing a circuit configuration of a power supply device according to Embodiment 1 of the present invention.

Embodiment 1 of the present invention is described below in detail based on FIG. 1 to FIG. 4. In the drawings, the same or corresponding parts are denoted by the same symbols, and description thereof is not repeated. In order to easily understand a capacitor unit 10 (a power supply device) according to one aspect of the present invention, first, an outline of a power supply system 1 including the capacitor unit 10 is described using FIG. 2. Moreover, in the following description, "AC" represents "Alternating Current", and "DC" represents "Direct Current".

(Outline of Power Supply System)

Figure 2:
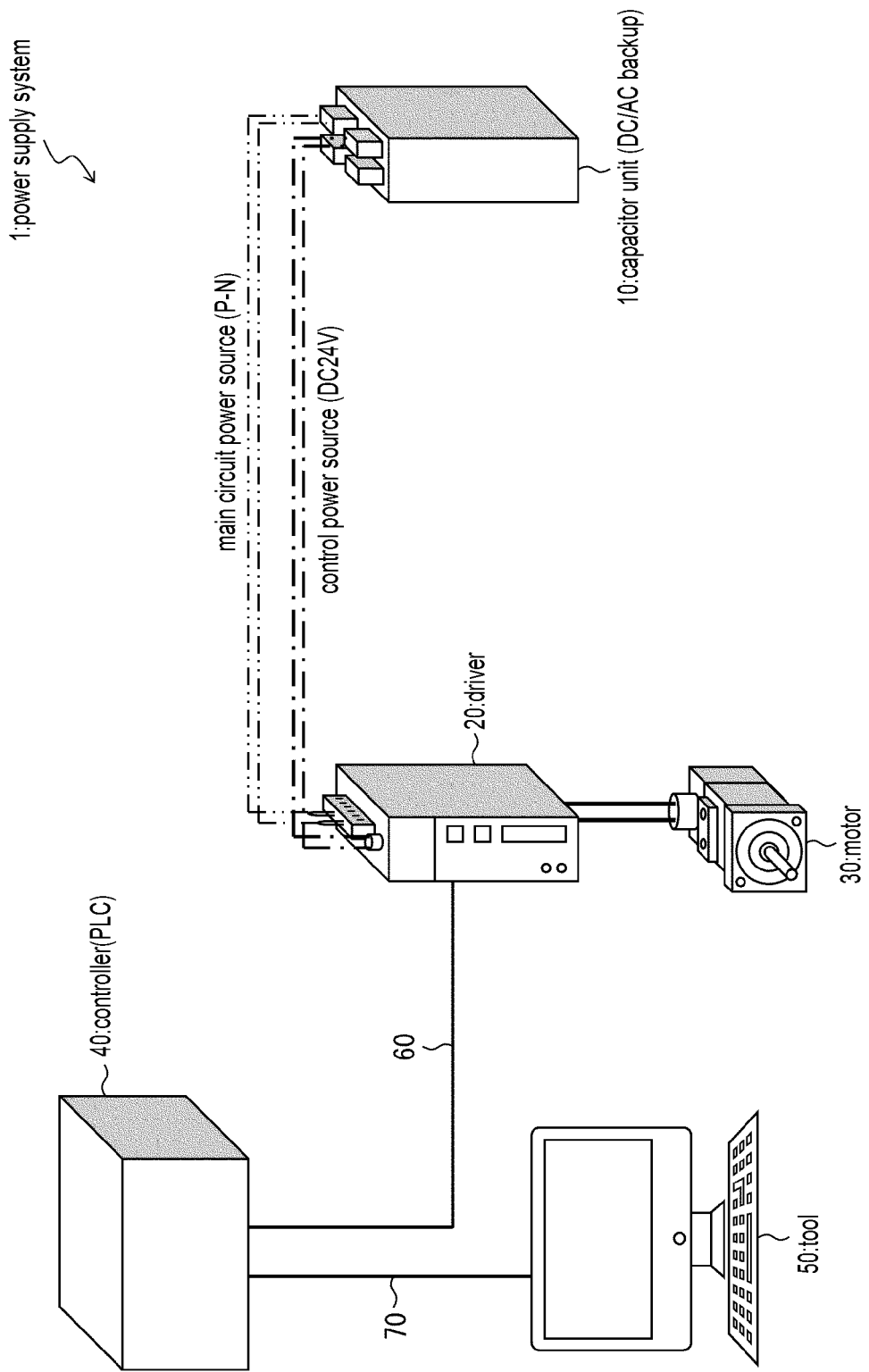
FIG. 2 is a diagram showing an overall outline of a power supply system including the power supply device in FIG. 1.

FIG. 2 is a diagram showing an overall outline of the power supply system 1 including the capacitor unit 10. As illustrated in FIG. 2, the power supply system 1 includes the capacitor unit 10, a driver 20, and a motor 30, and may further include a controller 40 and a tool 50.

The controller 40 is, for example, a PLC (Programmable Logic Controller), and is a master device which manages data transmission via a field network 60 in the power supply system 1. The driver 20 is connected as a slave device to the controller 40 serving as the master device.

Figure 7:
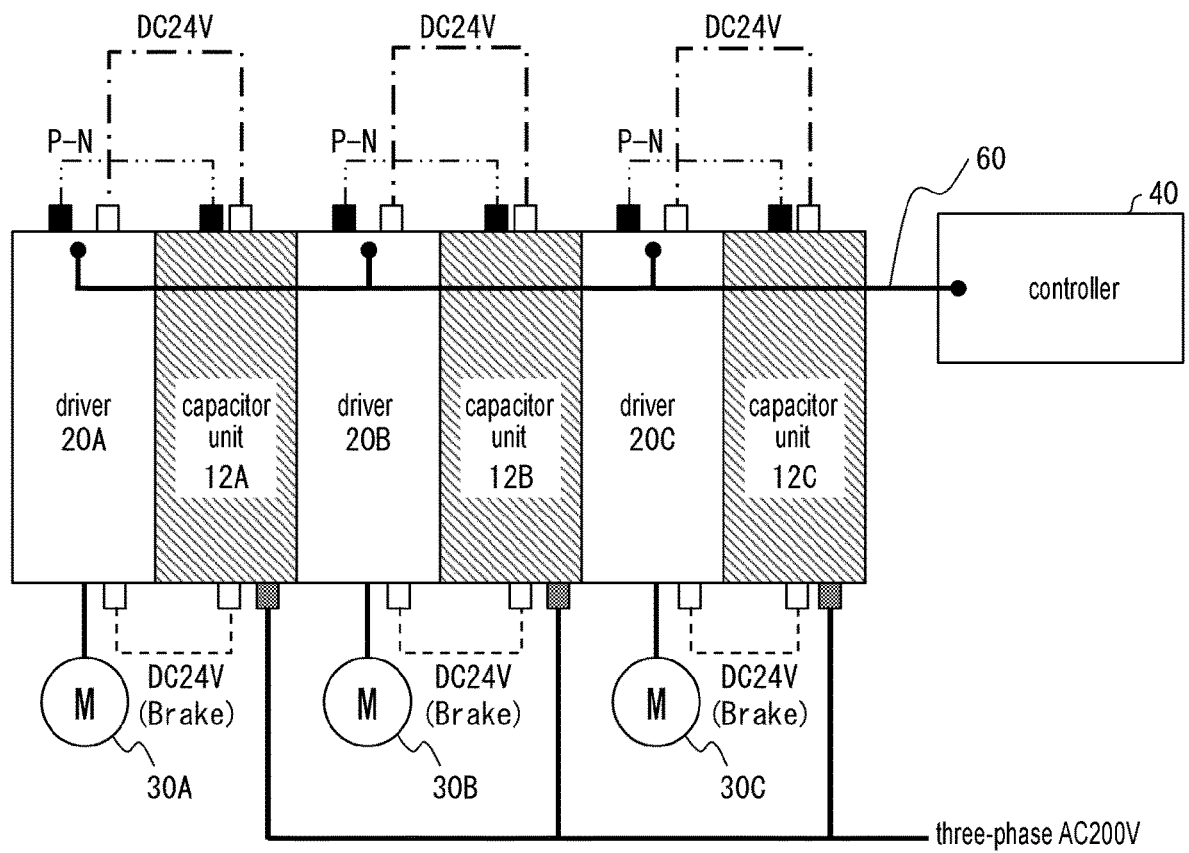
FIG. 7 is a diagram showing an example of connection of the power supply device in FIG. 6 to a motor drive device.

Moreover, FIG. 2 shows an example in which the controller 40 serving as the master device is connected to one driver 20 (the slave device). However, the slave device connected to the master device is not necessarily to be one, and the controller 40 serving as the master device may be connected to a plurality of drivers 20 (the slave device). FIG. 7 described later shows an example in which the controller 40 is connected to a plurality of drivers 20.

The driver 20 is a motor control device which is connected to the controller 40 via the field network 60 and drives the motor 30 according to command values from the controller 40. More specifically, the driver 20 receives the command values such as a position command value, a speed command value, and a torque command value at a predetermined time interval (cycle) from the controller 40. In addition, the driver 20 receives, from detectors such as a position sensor (rotary encoder) and a torque sensor connected to shafts of the motor 30, actual measurement values relating to an operation of the motor 30 such as a position, a speed (typically, calculated from a difference between a current position and a previous position), and a torque. Then, the driver 20 sets the command values from the controller 40 as target values, and performs feedback control using the actual measurement values as feedback values. That is, the driver 20 receives the command value of each shaft from the controller 40, and performs the feedback control in a manner that output of each shaft (that is, a control amount of each shaft) of the motor 30 which is a control target follows the command value of each shaft. Specifically, the driver 20 adjusts a current for driving the motor 30 in a manner that the actual measurement values approach the target values. Moreover, the driver 20 may be referred to as a servo motor amplifier.

The driver 20 includes a main circuit which "supplies a current (power) for driving the motor 30 to the motor 30" and a control circuit which "performs control of the main circuit and the like". The driver 20 obtains a main circuit power source (DC power source for the main circuit) and a control power source (DC power source for the control circuit) from the capacitor unit 10. The main circuit power source is used as a motor drive power source, and the control power source is used as a power source for the control circuit configured by a micro-combiner and the like. When the main circuit is supplied with the main circuit power source, the supplied main circuit power source is converted to the motor drive power source and supplied to the motor 30. When being supplied with the control power source, the control circuit controls the main circuit in a manner that a control amount of the motor 30 follows the command values from the controller 40.

The driver 20 may further include a circuit (a brake control circuit) which controls "a brake which decelerates the motor 30 independently of an operation of the main circuit when a sudden change in an input voltage occurs". The brake control circuit included in the driver 20 brakes the motor 30 independently of the operation of the main circuit to decelerate the motor 30 when a sudden change in the input voltage occurs in the power source supplied to the brake control circuit. In addition, the brake control circuit may maintain a stop state of the motor 30 in which drive power is not supplied from the main circuit of the driver 20 during power interruption or the like.

Moreover, in the following description, an example is described in which the circuit (the brake control circuit) which controls "the brake which decelerates the motor 30 independently of the operation of the main circuit when a sudden change in the input voltage occurs" is built in the driver 20. However, it is not essential for the power supply system 1 that the brake control circuit is built in the driver 20. In the power supply system 1, a circuit or device which controls "the brake which decelerates the motor 30 independently of the operation of the main circuit of the driver 20 when a sudden change in the input voltage occurs" may exist independent of the driver 20.

The field network 60 transmits various data received by the controller 40 or transmitted by the controller 40. Various industrial Ethernet (registered trademark) can be typically used as the field network 60. As the industrial Ethernet (registered trademark), for example, EtherCAT (registered trademark), PROFINET (registered trademark) IRT, MECHATROLINK (registered trademark)-III, Power link, SERCOS (registered trademark)-III, CIP Motion and the like are known, and any of these may be employed. Furthermore, a field network other than the industrial Ethernet (registered trademark) may be used. For example, EtherNet/IP (registered trademark), DeviceNet, CompoNet/IP (registered trademark) and the like may be used. As for the power supply system 1, typically, a configuration in which EtherCAT (registered trademark) which is an industrial Ethernet (registered trademark) is employed as the filed network 60 is illustrated.

The motor 30 is controlled by the driver 20 and drives a load machine which is not shown. Specifically, the motor 30 drives according to the current supplied from the main circuit of the driver. The motor 30 may be, for example, a servo motor or a stepping motor.

Moreover, although FIG. 2 shows an example in which the motor 30 is a servo motor and the driver 20 is a servo driver, other configurations are possible in which, for example, the motor 30 is a pulse motor and the driver 20 is a pulse motor driver.

The tool 50 is connected to the controller 40 via a communication cable 70. The tool 50 is means for a human and a machine to exchange information, and is specifically means by which the human operates the machine (or gives instructions to the machine) or the machine informs the human of a current state/result. As for the tool 50, the means by which the human give instructions to the machine may be a switch, a button, a handle, a dial, a pedal, a remote control, a microphone, a keyboard, a mouse or the like, and the means by which the machine conveys information related to the current state/result to the human may be a liquid crystal screen, a meter, a lamp, a speaker and the like. The tool 50 may be typically configured by a general-purpose computer or a HMI (Human Machine Interface). For example, an information processing program executed by the tool 50 may be stored in a CD-ROM (Compact Disk-Read Only Memory) which is not shown and be distributed. The program stored in the CD-ROM is read by a CD-ROM driving device which is not shown and stored in a hard disk or the like of the tool 50. Alternatively, the program may be downloaded from an upper host computer or the like via a network.

The tool 50 may set various parameters for the power supply system 1 (particularly, the controller 40). For example, timing of obtaining state values (input refresh) and timing of updating output values (output refresh) may be calculated and set by the tool 50. In addition, the tool 50 also provides an environment for a user to write a user program serving as a control program which is executed by the controller 40 according to a control purpose (for example, target line and process).

The capacitor unit 10 is a power supply device which supplies power to the driver 20, and is a power supply device to which AC power source is input from a commercial power source or the like and from which DC power source is output to the driver 20. Specifically, the capacitor unit 10 supplies the driver 20 with the main circuit power source ("P-N" in FIG. 2, DC power source for the main circuit of the driver 20) and the control power source ("DC 24 V" in FIG. 2, DC power source for the control circuit of the driver 20). For example, the capacitor unit 10 is supplied with a single-phase AC power source of 200 V and supplies a DC current of 24 V to the control circuit of the driver 20. In addition, the capacitor unit 10 is supplied with a three-phase AC power source of 200 V and supplies a DC current of 200 V to the main circuit of the driver 20. Furthermore, the capacitor unit 10 may be supplied with a single-phase AC power source of 200 V and supplies a DC current of 24 V to the brake control circuit of the driver 20. Moreover, the power source which the capacitor unit 10 supplies to the brake control circuit of the driver 20 may be referred to as the "brake power source" in the following description.

As described above, the power (the power source) which the capacitor unit 10 supplies to the driver 20 includes, for example, two types, namely, a DC 200 V system ("main circuit power source") and a DC 24 V system ("control circuit power source" or "control circuit power source and brake power source").

The capacitor unit 10 can take measures for the driver 20 against a sudden change in the input voltage such as an instantaneous voltage drop, an instantaneous power failure or the like caused by a lightning strike or the like without changing the driver 20 which is a conventional motor control device, and the details will be described later. In the capacitor unit 10, the control power source for the driver 20 is secured by a first backup capacitor 100. Therefore, the control circuit of the driver 20 can continue the operation even when a sudden change in the input voltage caused by a lightning strike or the like occurs. When a sudden change in the input voltage occurs, charging power of the first backup capacitor 100 of the capacitor unit 10 is consumed as the power source of the control circuit of the driver 20, and charging power of a second backup capacitor 109 is consumed as the power source of the main circuit of the driver 20.

(Outline of Power Supply Device)

For the capacitor unit 10 included in the power supply system 1 whose outline has been described using FIG. 2, a configuration and contents of processing are described below using FIG. 1 and the like. Before describing the details with reference to FIG. 1, in order to facilitate understanding of the capacitor unit 10, the outline of the capacitor unit 10 is organized as follows.

The capacitor unit 10 (the power supply device) is a power supply device which supplies power to the main circuit of the driver 20 (the motor drive device) which supplies motor drive power to the motor 30, and the capacitor unit 10 includes a rectifier 104 (a rectification circuit) for rectifying an alternating current input from an external AC power source, and a control power source output terminal 101 for supplying power to the control circuit of the driver 20 which controls the main circuit. In the capacitor unit 10, (1) the first backup capacitor 100 is inserted between the rectifier 104 and the control power source output terminal 101, and (2) the first backup capacitor 100 is charged by output of the rectifier 104. For example, (1) a positive electrode terminal of the first backup capacitor 100 is electrically connected to a positive side output terminal of the rectifier 104, and (2) a negative electrode terminal of the first backup capacitor 100 is electrically connected to a negative side output terminal of the rectifier 104.

In FIG. 1, (1) the positive electrode terminal of the first backup capacitor 100 is electrically connected between the positive side output terminal of the rectifier 104 and a positive side 101A of the control power source output terminal 101. In addition, (2) the negative electrode terminal of the first backup capacitor 100 is electrically connected between the negative side output terminal of the rectifier 104 and a negative side 101B of the control power source output terminal 101.

According to the above configuration, the capacitor unit 10 includes the first backup capacitor 100 between the rectifier 104 and the control power source output terminal 101 which supplies power to the control circuit of the driver 20. Besides, the first backup capacitor 100 is charged by the output of the rectifier 104.

Therefore, the capacitor unit 10 has an effect of being capable of supplying the charging power of the first backup capacitor 100 to the control circuit of the driver 20 even when a sudden change in the input voltage such as an instantaneous voltage drop, an instantaneous power failure or the like caused by a lightning strike or the like occurs.

In addition, the capacitor unit 10 has an effect of being capable of taking measures for the driver 20 against a sudden change in the input voltage such as an instantaneous voltage drop, an instantaneous power failure or the like caused by a lightning strike or the like without changing the driver 20.

The capacitor unit 10 may further include the second backup capacitor 109 connected between a positive side output terminal 110A and a negative side output terminal 110B for supplying power to the main circuit of the driver 20.

According to the above configuration, the capacitor unit 10 further includes the second backup capacitor 109 connected between the positive side output terminal 110A and the negative side output terminal 110B for supplying power to the main circuit of the driver 20. Besides, the second backup capacitor 109 is charged by the power which is input to a main circuit power source output terminal 110 which supplies power to the main circuit of the driver 20.

Therefore, the capacitor unit 10 has an effect of being capable of supplying charging power of the second backup capacitor 109 to the main circuit of the driver 20 even when a sudden change in the input voltage such as an instantaneous voltage drop, an instantaneous power failure or the like caused by a lightning strike or the like occurs.

When a sudden change in the input voltage to the host device occurs, the capacitor unit 10 notifies the outside that a sudden change in the input voltage has occurred. Specifically, the capacitor unit 10 includes a notification portion 200, and when it is detected that the input voltage of the AC power source input to the host device has suddenly changed, the notification portion 200 notifies the outside (for example, the controller 40) that "a sudden change in the input voltage has occurred".

According to the above configuration, the capacitor unit 10 has an effect of being capable of notifying, when a sudden change in the input voltage to the host device occurs, the controller 40 or the like that a sudden change in the input voltage has occurred and making the controller 40 or the like execute necessary processing at the time of "a sudden change in the input voltage". For example, when a sudden change in the input voltage to the host device occurs, the capacitor unit 10 notifies the controller 40 that a sudden change in the input voltage has occurred. Then, the controller 40 which has received this notification can, for example, stop the motor 30 which is connected to each of a plurality of the drivers 20 in synchronization with the plurality of drivers 20.

(Details of Capacitor Unit)

FIG. 1 is a diagram showing a circuit configuration of the capacitor unit 10 (the power supply device) according to Embodiment 1 of the present invention. As shown in FIG. 1, the capacitor unit 10 includes an AC power source input terminal 102, a capacitor 103, the rectifier 104, the first backup capacitor 100, a DC/DC power source converter module 105, the control power source output terminal 101, an AC power source input terminal 106, a capacitor 107, a rectifier 108, the second backup capacitor 109, and the main circuit power source output terminal 110.

(Control Power Source Supply Circuit)

An AC power source received by the AC power source input terminal 102 from an external power source is rectified by the rectifier 104 and output as a control power source from the control power source output terminal 101 to the driver 20 after a voltage is adjusted to a desired value by the DC/DC power source converter module 105.

An AC power source (for example, a single-phase power source of 200 V) is input to the AC power source input terminal 102 by a commercial power source or the like. The rectifier 104 is connected to the AC power source input terminal 102 via the capacitor 103. The capacitor 103 reduces noise (harmonic current) from the AC power source. An AC voltage which has passed through the capacitor 103 is rectified by the rectifier 104.

The rectifier 104 outputs a DC voltage to the DC/DC power source converter module 105 via the first backup capacitor 100. A DC current output from the rectifier 104 is input to the control power source output terminal 101 via the DC/DC power source converter module 105.

Figure 5:
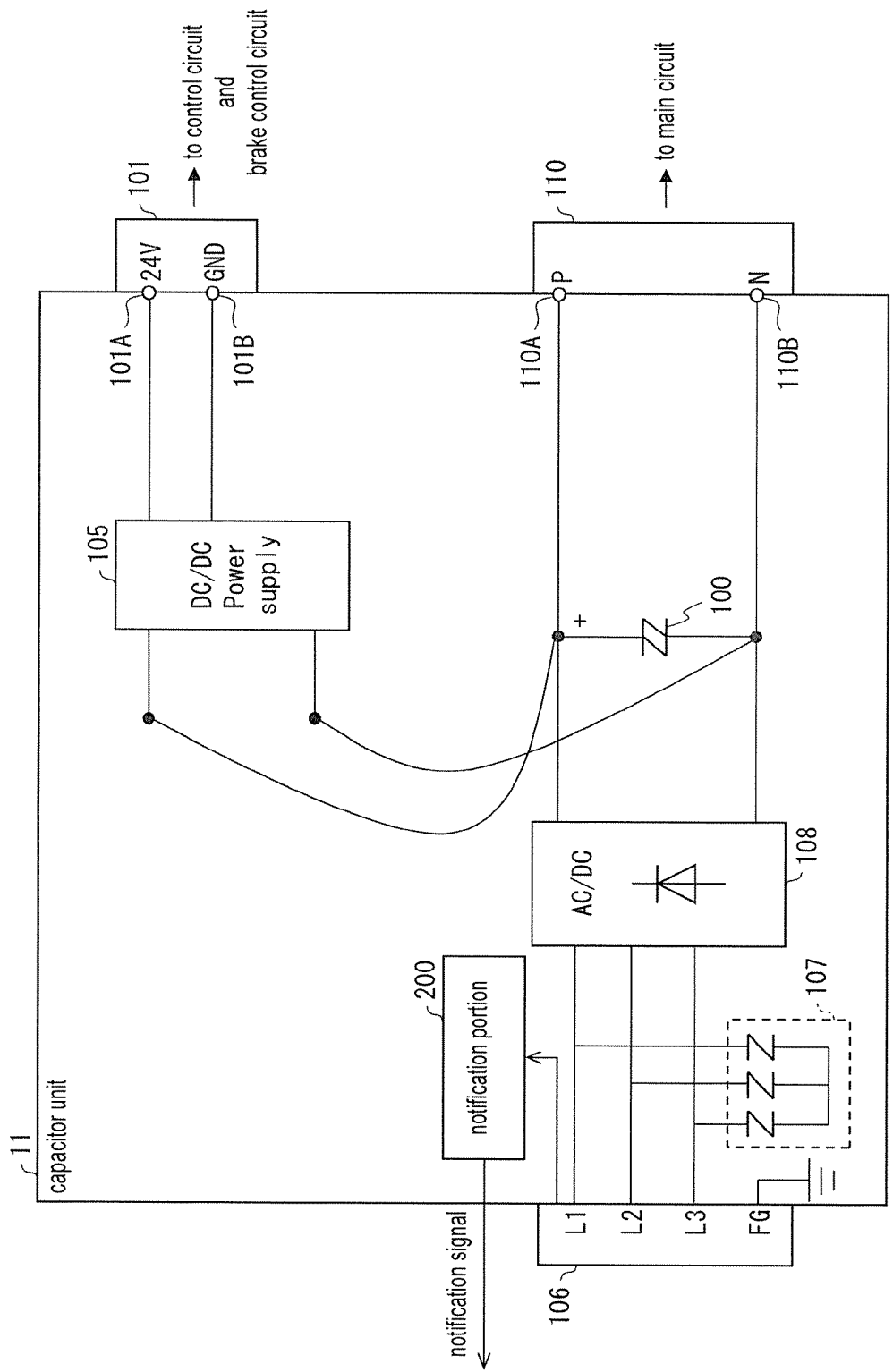
FIG. 5 is a diagram showing a circuit configuration of a power supply device according to Embodiment 2 of the present invention.
Figure 6:
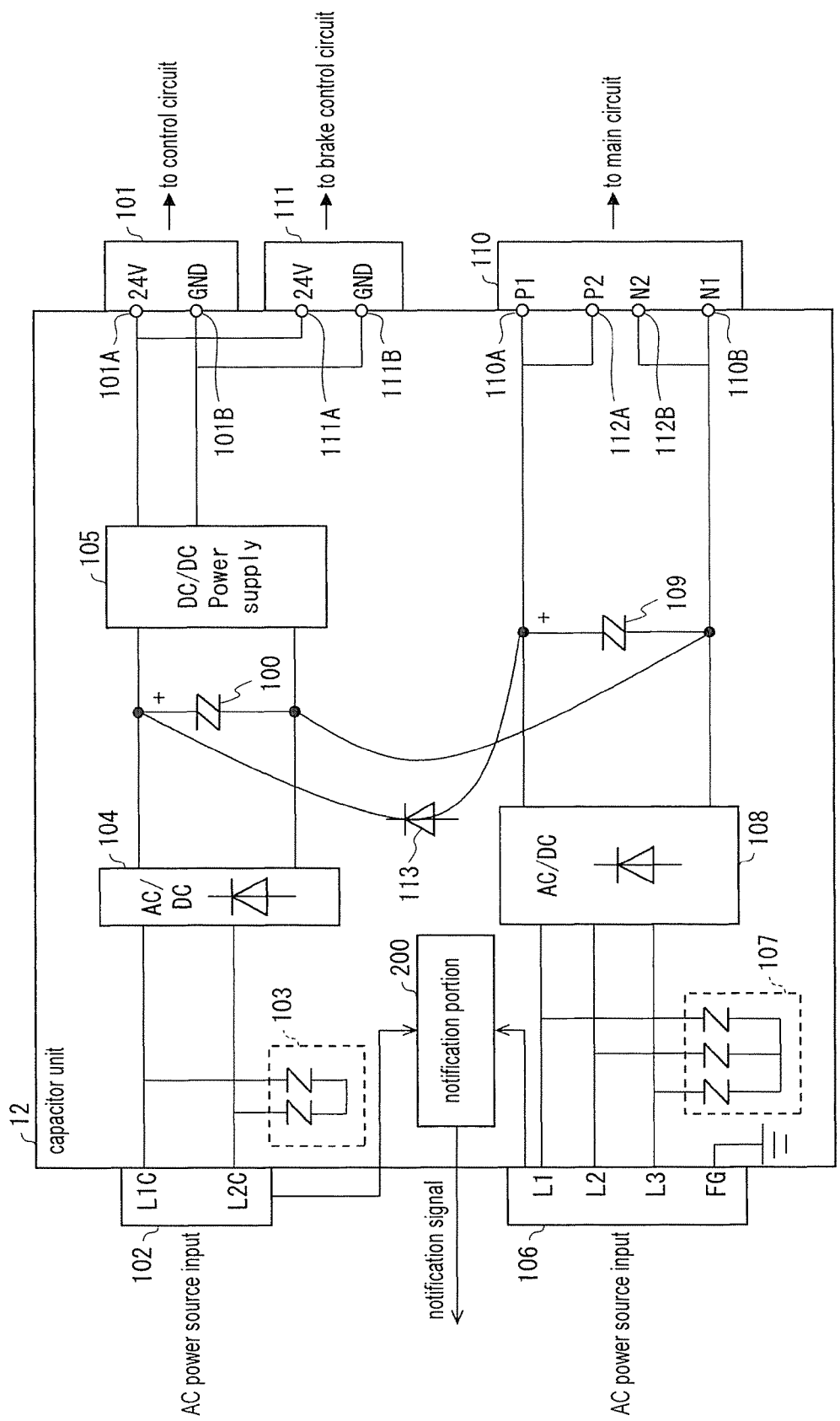
FIG. 6 is a diagram showing a circuit configuration of a power supply device according to Embodiment 3 of the present invention.

In FIG. 1, FIG. 5, and FIG. 6, the description "Power supply" indicates a converter. The DC/DC power source converter module 105 is a voltage conversion circuit which converts a voltage of the DC current output from the rectifier 104 into a desired voltage (for example, 24 V) and outputs the DC current which has been converted to the desired voltage to the control power source output terminal 101.

Moreover, in the capacitor unit 10, a capacitor unit 11 described later using FIG. 5, and a capacitor unit 12 described later using FIG. 6, the DC/DC power source converter module 105 is not essential. For example, in the capacitor unit 10, when the voltage of the DC current output from the rectifier 104 is the desired voltage to be input to the control power source output terminal 101, voltage conversion is not required, and thus the DC/DC power source converter module 105 is not necessary.

The control power source output terminal 101 supplies the driver 20 with the DC current, whose voltage has been adjusted to the desired value by the DC/DC power source converter module 105, as the control power source (the power supply for the control circuit of the driver 20).

Moreover, in the capacitor unit 10, the capacitor unit 11 described later using FIG. 5, and the capacitor unit 12 described later using FIG. 6, it is not essential that the control power source output terminal 101 supplies a DC current to the driver 20. In the capacitor unit 10, the capacitor unit 11, and the capacitor unit 12, the control power source output terminal 101 may supply an AC current to the driver 20 as the control power source. In this case, for example, an inverter circuit (a DC/AC inverter circuit) may be inserted between the first backup capacitor 100 and the control power source output terminal 101. The inverter circuit converts the DC current from the rectifier 104 (the first backup capacitor 100) into an AC current, and outputs the converted AC current to the control power source output terminal 101, and thereby the control power source output terminal 101 may supply the AC current to the driver 20 as the control power source.

The first backup capacitor 100 is inserted between the rectifier 104 and the control power source output terminal 101, for example, between the rectifier 104 and the DC/DC power source converter module 105. That is, FIG. 1 shows an example in which the positive electrode terminal of the first backup capacitor 100 is connected between the positive side output terminal of the rectifier 104 and the positive side input terminal of the DC/DC power source converter module 105. In the circuit example shown in FIG. 1, the negative electrode terminal of the first backup capacitor 100 is connected between the negative side output terminal of the rectifier 104 and the negative side output terminal of the DC/DC power source converter module 105.

The first backup capacitor 100 is charged by the output of the rectifier 104, and supplies a control power source to the control circuit of the driver 20 by discharging when a "sudden change in the input voltage" such as an instantaneous voltage drop, an instantaneous power failure or the like caused by a lightning strike or the like occurs. In other words, the first backup capacitor 100 supplies charging power to the control circuit of the driver 20 when a sudden change in the input voltage caused by a lightning strike or the like occurs. In addition, the first backup capacitor 100 absorbs regenerative energy from the motor 30.

The capacitor unit 10 supplies the charging power of the first backup capacitor 100 to the driver 20 as the control power source when a sudden change in the input voltage caused by a lightning strike or the like occurs. That is, the capacitor unit 10 secures the control power source for the driver 20 and enables control of the main circuit of the driver 20 (that is, control of driving of the motor 30) by a control circuit of the driver 20. Even when a sudden change in the input voltage occurs, the control circuit of the driver 20 can continue the operation by using electric charge remaining in the first backup capacitor 100.

(Main Circuit Power Source Supply Circuit)

The AC power source received by the AC power source input terminal 106 from the external power source is rectified by the rectifier 108 and is output as the main circuit power source to the driver 20 from the main circuit power source output terminal 110.

The AC power source (for example, a three-phase power source of 200 V) is input to the AC power source input terminal 106 by a commercial power source or the like. The rectifier 108 is connected to the AC power source input terminal 106 via the capacitor 107. The capacitor 107 reduces noise (harmonic current) from the AC power source. An AC voltage which has passed through the capacitor 107 is rectified by the rectifier 108.

The rectifier 108 outputs a DC voltage to the second backup capacitor 109 via the second backup capacitor 109. A DC current output from the rectifier 108 is input to the main circuit power source output terminal 110, and the main circuit power source output terminal 110 supplies the DC current output from the rectifier 108 to the driver 20 as the main circuit power source (the power source for the main circuit of the driver 20).

The second backup capacitor 109 is inserted between the rectifier 108 and the main circuit power source output terminal 110. That is, FIG. 1 shows an example in which a positive electrode terminal of the second backup capacitor 109 is connected between a positive side output terminal of the rectifier 108 and the positive side output terminal 110A of the main circuit power source output terminal 110. In the circuit example shown in FIG. 1, a negative electrode terminal of the second backup capacitor 109 is connected between a negative side output terminal of the rectifier 108 and the negative side output terminal 110B of the main circuit power source output terminal 110.

The second backup capacitor 109 is charged by the output of the rectifier 108, and supplies the main circuit power source to the main circuit of the driver 20 by discharging when a "sudden change in the input voltage" such as an instantaneous voltage drop, an instantaneous power failure or the like caused by a lightning strike or the like occurs. In other words, the second backup capacitor 109 supplies charging power to the main circuit of the driver 20 when a sudden change in the input voltage caused by a lightning strike or the like occurs. In addition, the second backup capacitor 109 absorbs the regenerative energy from the motor 30.

The capacitor unit 10 supplies the main circuit power source from the second backup capacitor 109 to the driver 20 when a sudden change in the input voltage caused by a lightning strike or the like occurs, that is, the capacitor unit 10 secures the main circuit power source of the driver 20. Even when a sudden change in the input voltage occurs, the main circuit of the driver 20 can use electric charge remaining in the second backup capacitor 109.

As described above, the capacitor unit 10 receives input of two systems of AC power sources (for example, a single-phase AC power source of 200 V and a three-phase AC power source of 200 V) and outputs two systems of DC power sources (for example, a DC control power source of 24 V and a DC main circuit power source of 200 V). The capacitor unit 10 also backs up the two systems of DC power sources (specifically, the control power source and the main circuit power source). That is, the capacitor unit 10 backs up the control power source by the first backup capacitor 100 and backs up the main circuit power source by the second backup capacitor 109.

Moreover, an electric capacity (capacitance, capacitor capacity) of the second backup capacitor 109 which charges backup power of the main circuit power source is larger than an electric capacity of the first backup capacitor 100 which charges backup power of the control circuit power source. However, it is not essential that the electric capacity of the second backup capacitor 109 is larger than the electric capacity of the first backup capacitor 100. For example, the electric capacity of the second backup capacitor 109 and the electric capacity of the first backup capacitor 100 may be equal.

(Notification Portion)

The capacitor unit 10 includes the notification portion 200 as a functional block. Moreover, in order to ensure simplicity of the description, configurations which are not directly related to the embodiment are omitted from the description and the circuit diagram in FIG. 1. However, the capacitor unit 10 may have the omitted configurations in accordance with an actual situation. The notification portion 200 illustrated in FIG. 1 can be achieved in a manner that, for example, a CPU (central processing unit) or the like reads out and executes, in a RAM (random access memory) or the like (not shown), a program stored in a storage device (not shown) which is achieved by a ROM (read only memory), a NVRAM (non-Volatile random access memory) or the like.

When a sudden change in the input voltage to the capacitor unit 10 occurs, the notification portion 200 notifies the outside that "a sudden change in the input voltage has occurred". The notification portion 200 is connected to, for example, the AC power source input terminal 102 and the AC power source input terminal 106. When it is detected that the input voltage of the AC power source input to at least one of the AC power source input terminal 102 and the AC power source input terminal 106 has suddenly changed, the notification portion 200 notifies the external device (for example, the controller 40 or the like) that "a sudden change in the input voltage has occurred".

(Example of Connection to Driver)

Figure 3:
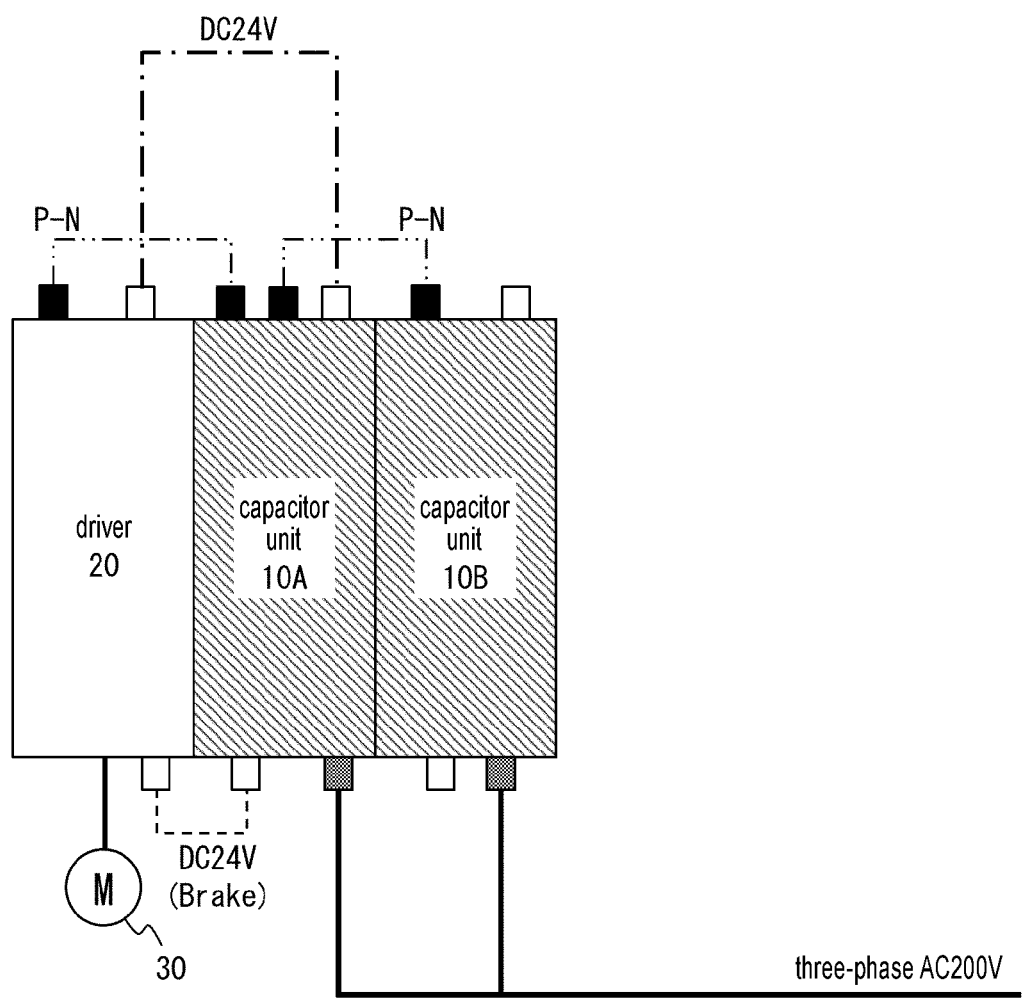
FIG. 3 is a diagram showing an example of connection of the power supply device in FIG. 1 to a motor drive device.

FIG. 3 is a diagram showing an example of connection of the capacitor unit 10 to the driver 20 (the motor driving device). Moreover, in the description of FIG. 3, a capacitor unit 10A and a capacitor unit 10B are capacitor units in which suffixes "A" and "B" are attached to the "capacitor unit 10" to distinguish each of the two "capacitor units 10". When it is not necessary to particularly distinguish each of the capacitor unit 10A and the capacitor unit 10B, they are simply referred to as "the capacitor unit 10".

In FIG. 3, the capacitor unit 10A supplies the driver 20 with a main circuit power source ("P-N" in FIG. 3) and a control power source ("DC 24 V" on the upper side of a paper plane in FIG. 3), and backs up the main circuit power source and the control power source.

In FIG. 3, the capacitor unit 10A further supplies a DC current ("DC 24 V (Brake)" on the lower side of the paper plane in FIG. 3) to the brake control circuit of the driver 20. The brake control circuit brakes the motor 30 to decelerate (rapidly decelerate) the motor 30 when a sudden change in the input voltage occurs in the power source supplied to the brake control circuit. In addition, the brake control circuit may maintain a stop state of the motor 30 in which the drive power is not supplied from the main circuit of the driver 20 during power interruption or the like.

However, an unexpected situation may occur when the brake control circuit causes the motor 30 to stop suddenly. Therefore, the capacitor unit 10A avoids the occurrence of an unexpected situation due to the sudden stop of the motor 30 by backing up the power source (the brake power source) to the brake control circuit of the driver 20.

The capacitor unit 10B is connected to the capacitor unit 10A. The capacitor unit 10A and the capacitor unit 10B are connected in parallel, and an AC power source (the "three-phase AC 200 V" in FIG. 3) is input to the capacitor unit 10A and the capacitor unit 10B from the outside.

As illustrated in FIG. 3, the capacitor unit 10B can be added to the capacitor unit 10A, and when a situation occurs in which an electric capacity of the capacitor unit 10A is insufficient, the electric capacity of the capacitor unit 10A can be increased artificially. More accurately, the capacitor unit 10A can use an electric capacity of the capacitor unit 10B by being electrically connected in parallel to the capacitor unit 10B.

That is, the capacitor unit 10 (for example, the capacitor unit 10A) includes a connector (an external connector) for being electrically connected to "a capacitor unit 10 (the capacitor unit 10B) other than the host unit". The capacitor unit 10 (for example, the capacitor unit 10A) can add (electrically connected with) "a capacitor unit 10 (the capacitor unit 10B) other than the host unit" by the connector. The capacitor unit 10A and the capacitor unit 10B are electrically connected to each other in parallel in a manner that the connectors of each other are connected directly or connected by wire.

By being electrically connected in parallel to "a capacitor unit 10 other than the host unit" via the connector, the capacitor unit 10 can (artificially) increase the electric capacity, that is, can use an electric capacity of "the capacitor unit 10 other than the host unit". In other words, the capacitor unit 10 can add "the capacitor unit 10 (the capacitor unit 10B) other than the host unit" by the connector and (artificially) increase the electric capacity of the first backup capacitor 100. Therefore, the capacitor unit 10 can cope with a situation where the electric capacity of the second backup capacitor 109 is insufficient.

Moreover, FIG. 3 shows an example in which the capacitor unit 10 (the capacitor unit 10A in the example of FIG. 3) is electrically connected to one "capacitor unit 10 (the capacitor unit 10B in the example of FIG. 3) other than the host unit" via the connector. However, the "capacitor unit 10 other than the host unit" to which the capacitor unit 10 can be electrically connected in parallel via the connector is not limited to one. The capacitor unit 10 can be electrically connected in parallel to a plurality of (for example, two or three) the "capacitor units 10 other than the host unit" via connectors. In other words, the capacitor unit 10 includes a plurality of connectors (the external connectors) for being electrically connected to the "capacitor units 10 other than the host unit".

In addition, FIG. 3 shows an example in which the connector of the capacitor unit 10 (the capacitor unit 10A in the example of FIG. 3) and the connector of another capacitor unit 10 (the capacitor unit 10B in the example of FIG. 3) are electrically connected by wire. However, it is not essential that the connectors of the plurality of capacitor units 10 are electrically connected by wire. The connectors of the plurality of capacitor units 10 may also be directly connected. For example, the connector of the capacitor unit 10A and the connector of the capacitor unit 10B may be directly connected.

Moreover, the "connector (the external connector)" described here corresponds to a "capacitor extension terminal 112" shown in FIG. 6, and details of the capacitor extension terminal 112 will be described later using FIG. 6.

Figure 4:
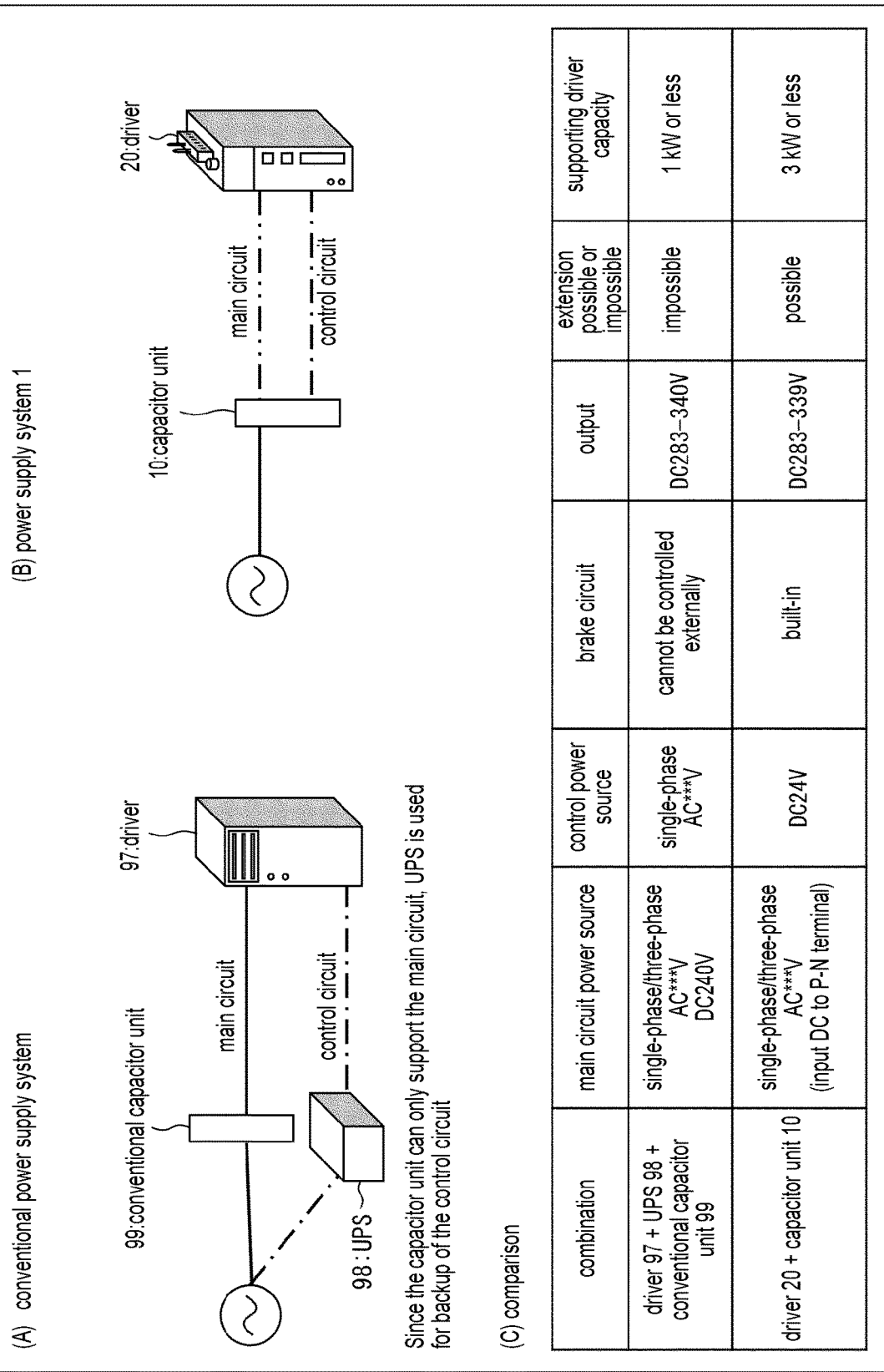
FIG. 4 shows an outline of each of the power supply system in FIG. 2 and a conventional power supply system and a comparison between the two.

(Comparison with Conventional Power Supply System) FIG. 4 shows an outline of each of the power supply system 1 and a conventional power supply system and a comparison between the two. (A) of FIG. 4 is a diagram showing an overall outline of the conventional power supply system. The conventional power supply system has a configuration in which a conventional capacitor unit 99 supplies a main circuit power source to a main circuit of a driver 97, and an UPS (Uninterruptible Power Supply) 98 supplies a control power source to a control circuit of the driver 97. (B) of FIG. 4 is a diagram for describing the power (power source) supplied to the driver 20 by the power supply system 1, particularly by the capacitor unit 10. (C) of FIG. 4 is a table for comparing the "conventional power supply system" illustrated in (A) of FIG. 4 and the power supply system 1 illustrated in (B) of FIG. 4. In the table of (C) of FIG. 4, a "combination" of "the driver 97+ the UPS 98+ the conventional capacitor unit 99" indicates the "conventional power supply system", and a "combination" of "the driver 20+ the capacitor unit 10" indicates the power supply system 1.

With respect to the power supply system 1 and the conventional power supply system described above, first, risks which are common to both and are associated with occurrence of "a sudden change in an input voltage" such as an instantaneous voltage drop, an instantaneous power failure or the like caused by a lightning strike or the like are described.

(Risks Associated with Sudden Change in Input Voltage) During operation of the driver 20 and the driver 97, if a "sudden change in the input voltage" such as an instantaneous voltage drop, an instantaneous power failure or the like caused by a lightning strike or the like occurs, a plurality of mechanisms controlled by the driver 20 or the driver 97 interfere with each other, and damage of work-pieces or the like may occur. For example, since multiple axes move synchronously in work related to liquid agent filling, the plurality of mechanisms with different inertias (for example, a mechanism of a nozzle part and a mechanism of a transport part) interfere or collide with each other when the input voltage changes suddenly, and an expensive nozzle may break accordingly. More specifically, the inertia of a long conveyor is large, whereas the inertia of a liquid filling machine is small, and thus, if "a sudden change in the input voltage" occurs, positional deviation increases, and the expensive nozzle may break. In addition, restoration work in an aseptic space where the liquid agent filling machine is operated not only takes an enormous amount of man-hours, but also can cause an enormous amount of damage to waste loss and replenishment of the liquid agent.

Here, in order to make the motor 30 or the like stop normally when the input voltage suddenly changes due to a lightning strike or the like (such as an instantaneous voltage drop, an instantaneous power failure, or the like), power is required to be supplied to both the main circuit and the control circuit of "the driver 20 or the driver 97". That is, if not only the main circuit power source of "the driver 20 or the driver 97" but also the control power source is not backed up, a huge loss including damage to the nozzle associated with a sudden change in the input voltage caused by a lightning strike or the like is incurred.

However, in a factory or the like where the aforementioned liquid agent filling machine operates, an installation space for an instrument for backing up the power source of the driver 20 or the driver 97 is often limited.

(Conventional Power Supply System) In the conventional power supply system illustrated in (A) of FIG. 4, as a measure for avoiding the risk associated with the "sudden change in the input voltage", that is, in order to stop the plurality of axes (the plurality of mechanisms) as they are synchronized when the input voltage suddenly changes, the following configuration is employed.

That is, conventionally, the "conventional capacitor unit 99 capable of backing up only the main circuit power source of the driver 97" and the "UPS 98 which backs up only the control power source of the driver 97" as described in patent literature 1 above are used together. As illustrated in (A) of FIG. 4, in the conventional power supply system, the "control power source of the driver 97" is backed up by the UPS 98 or the like which is different from the conventional capacitor unit 99 which backs up the "main circuit power source of the driver 97".

However, as described above, there are limited places to back up the power source of the driver 97 in a factory or the like, and thus the UPS 98 used for backing up the control power source of the driver 97 has to be a small, high-performance but expensive UPS. In addition, the UPS 98 requires maintenance such as periodic battery replacement, and is generally difficult to be extended when the electric capacity is insufficient.

(Power Supply System According to the Embodiment) The capacitor unit 10 illustrated in (B) of FIG. 4 performs two systems of power source output of the main circuit power source and the control power source of the driver 20, and backs up both the main circuit power source and the control power source. In other words, the capacitor unit 10 backs up both the "main circuit power source for driving the motor 30 (the motor drive power source)" and the "control power source for controlling the drive of the motor 30 (that is, the main circuit)".

Therefore, even when a sudden change in the input voltage caused by a lightning strike or the like occurs, the capacitor unit 10 continues to supply power source to the driver 20, and thus, for example, the plurality of axes are controlled synchronously, and the collision between the mechanisms are avoided. In addition, the capacitor unit 10 supplies the main circuit power source and the control power source to the driver 20, and backs up both of the main circuit power source and the control power source, and further copes with energy utilization for regeneration/powering. Furthermore, in the power supply system 1, since the capacitor unit 10 backs up the control power source of the driver 20, the UPS 98 is unnecessary, and the installation space for the UPS 98 is obviously unnecessary.

(Comparison Table)

Using (C) of FIG. 4, differences between the "conventional power supply system" illustrated in (A) of FIG. 4 and the power supply system 1 illustrated in (B) of FIG. 4 are summarized. Moreover, as shown in (C) of FIG. 4, there is almost no difference in "main circuit power source" and "output" between the "conventional power supply system" and the power supply system 1, and thus details of "main circuit power source" and "output" are described briefly.

In the "conventional power supply system (the driver 97+ the UPS 98+ the conventional capacitor unit 99)", the "control power source" is a "single-phase AC power source". On the other hand, in the power supply system 1 (the driver 20+ the capacitor unit 10), the "control power source" is a "DC power source (for example, DC 24 V)". Therefore, in the power supply system 1, the capacitor unit 10 can back up the control power source of the driver 20 by the first backup capacitor 100.

In addition, the conventional capacitor unit 99 cannot externally control the "brake circuit (brake control circuit)", in other words, the conventional capacitor unit 99 cannot back up the power source for the brake circuit. On the other hand, in the power supply system 1, the driver 20 has a built-in "brake circuit (brake control circuit)", and the capacitor unit 10 supplies a DC current of 24 V to the brake control circuit of the driver 20 as illustrated in FIG. 3. Besides, the capacitor unit 10 can supply the charging power of the first backup capacitor 100 to the brake control circuit of the driver 20, that is, the capacitor unit 10 can back up the brake power source. Moreover, the details of the backup of the brake power source by the first backup capacitor 100 will be described later using FIG. 6 and FIG. 7.

Furthermore, in the conventional capacitor unit 99, "extension (that is, electrical connection to the conventional capacitor unit 99 other than the host unit)" is impossible, and a "supporting driver capacity (that is, regenerative energy which can be absorbed)" is "1 kW or less". On the other hand, in the capacitor unit 10, "extension" is "possible", and a "supporting driver capacity" can be set to "3 kW or less" due to the "extension".

(Functions Achieved by Capacitor Unit)

The capacitor unit 10 can achieve the following three functions which cannot be achieved by the conventional capacitor unit. First, the capacitor unit 10 can back up both the main circuit power source and the control power source of the driver 20. Second, the capacitor unit 10 can cope with the insufficiency of the electric capacity of at least one of the first backup capacitor 100 and the second backup capacitor 109 by adding "a capacitor unit 10 other than the host unit". In addition, the capacitor unit 10 can also support a large amount of regenerative energy by adding a "capacitor unit 10 other than the host unit". For example, the capacitor unit 10 can support a regenerative energy of 3 kW, and can also support a large-sized liquid agent filling machine having a large regenerative energy. Third, the capacitor unit 10 has a function of detecting "a sudden change in the input voltage" such as an instantaneous voltage drop, an instantaneous power failure or the like and notifying the "sudden change in the input voltage" to the outside (for example, outputting a signal to notify the outside that the "sudden change in the input voltage" is detected). Details of the function of "notifying a sudden change in the input voltage" included in the capacitor unit 10 are described below.

(Function of "Notifying Sudden Change in Input Voltage")

The capacitor unit 10 has the function of detecting a "sudden change in the input voltage" and outputting it to the outside. The capacitor unit 10 illustrated in FIG. 1 includes the notification portion 200 which outputs a notification signal to the outside when a "sudden change in the input voltage" is detected. The capacitor unit 10 has an effect of being capable of using the notification signal output from the notification portion 200 that a "sudden change in the input voltage" is detected as a trigger to cause the controller 40 or the like to execute necessary processing at the time of the "sudden change in the input voltage". For example, the controller 40 notified of the "sudden change in the input voltage" can cause the plurality of drivers 20 to synchronically stop the motors 30 which are connected to each of the plurality of drivers 20.

Embodiment 2

Embodiment 2 of the present invention is described as following based on FIG. 5. Moreover, for convenience of description, members having the same functions as the members which have been described in the above embodiment are given the same symbols, and descriptions thereof are omitted. The capacitor unit 11 in the present embodiment is different from the capacitor unit 10 in Embodiment 1 described above in that the capacitor unit 11 according to the present embodiment has one power source input. Details of the capacitor unit 11 are described below using FIG. 5.

FIG. 5 is a diagram showing a circuit configuration of the capacitor unit 11 (the power supply device) according to Embodiment 2 of the present invention. The capacitor unit 11 is supplied with a three-phase AC power source of 200 V, supplies a DC current of 24 V to the control circuit of the driver 20, and supplies a DC current of 200 V to the main circuit of the driver 20. In other words, an AC power source received by the AC power source input terminal 106 from an external power source is rectified by the rectifier 108 and output as a control power source from the control power source output terminal 101 to the driver 20 after a voltage is adjusted to a desired value by the DC/DC power source converter module 105. In addition, the AC power source received by the AC power source input terminal 106 from the external power source is rectified by the rectifier 108 and output as a main circuit power source to the driver 20 from the main circuit power source output terminal 110.

Specifically, an AC power source (for example, a three-phase AC power source of 200 V) is input to the AC power source input terminal 106 by a commercial power source or the like, and the capacitor 107 reduces noise (harmonic current) from the AC power source input to the AC power source input terminal 106. An AC voltage which has passed through the capacitor 107 is rectified by the rectifier 108. The rectifier 108 outputs the DC voltage to the DC/DC power source converter module 105 and the main circuit power source output terminal 110 via the first backup capacitor 100. That is, the rectifier 108 is connected to the DC/DC power source converter module 105 and the main circuit power source output terminal 110 via the first backup capacitor 100.

The DC/DC power source converter module 105 connected to the rectifier 108 via the first backup capacitor 100 converts a voltage of the DC current output from the rectifier 108 to a desired voltage (for example, 24 V). The DC/DC power source converter module 105 outputs the DC current of which the voltage has been converted into the desired voltage to the control power source output terminal 101. The control power source output terminal 101 supplies the DC current of which the voltage has been adjusted to the desired value by the DC/DC power source converter module 105 as the control power source (the power source for the control circuit of the driver 20) to the driver 20.

Similarly, the main circuit power source output terminal 110 connected to the rectifier 108 via the first backup capacitor 100 supplies the DC current output from the rectifier 108 to the driver 20 as the main circuit power source (the power source for the main circuit of the driver 20).

(Backup of Control Power Source)

The first backup capacitor 100 is inserted between the rectifier 108 and the control power source output terminal 101, for example, between the rectifier 108 and the DC/DC power source converter module 105. That is, FIG. 5 shows an example in which the positive electrode terminal of the first backup capacitor 100 is connected between the positive side output terminal of the rectifier 108 and the positive side input terminal of the DC/DC power source converter module 105. In the circuit example shown in FIG. 5, the negative electrode terminal of the first backup capacitor 100 is connected between the negative side output terminal of the rectifier 108 and the negative side input terminal of the DC/DC power source converter module 105. The first backup capacitor 100 is charged by output of the rectifier 108, and supplies the control power source to the control circuit of the driver 20 by discharging when a "sudden change in the input voltage" such as an instantaneous voltage drop, an instantaneous power failure or the like caused by a lightning strike or the like occurs.

(Backup of Main Circuit Power Source)

In the capacitor unit 11, the first backup capacitor 100 inserted between the rectifier 108 and the main circuit power source output terminal 110 also backs up the main circuit power source. In FIG. 5, the positive electrode terminal of the first backup capacitor 100 is connected between the positive side output terminal of the rectifier 108 and the positive side output terminal 110A of the main circuit power source output terminal 110. In addition, the negative electrode terminal of the first backup capacitor 100 is connected between the negative side output terminal of the rectifier 108 and the negative side output terminal 110B of the main circuit power source output terminal 110.

The first backup capacitor 100 is charged by the output of the rectifier 108 and supplies the main circuit power source to the main circuit of the driver 20 by discharging when a "sudden change in the input voltage" such as an instantaneous voltage drop, an instantaneous power failure or the like caused by a lightning strike or the like occurs. In other words, the first backup capacitor 100 supplies charging power to the main circuit of the driver 20 when a sudden change in the input voltage caused by a lightning strike or the like occurs.

In addition, the first backup capacitor 100 absorbs regenerative energy from the motor 30.

As described above, the capacitor unit 11 receives input of one system of AC power source (for example, a three-phase AC power source of 200 V) and outputs two systems of DC power sources (for example, a DC control power source of 24 V and a DC main circuit power source of 200 V). The capacitor unit 11 also backs up the two systems of DC power sources (specifically, the control power source and the main circuit power source). That is, the capacitor unit 11 backs up the control power source and the main circuit power source by the first backup capacitor 100.

That is, the capacitor unit 11 (the power supply device) is a power supply device which supplies power to the main circuit of the driver 20 (the motor drive device) which supplies motor drive power to the motor 30, and the capacitor unit 11 includes the rectifier 108 (a rectification circuit) for rectifying an alternating current input from the external AC power source, and the control power source output terminal 101 for supplying power to the control circuit of the driver 20 which controls the main circuit. In the capacitor unit 11, (1) the first backup capacitor 100 is inserted between the rectifier 108 and the control power source output terminal 101, and (2) the first backup capacitor 100 is charged by output of the rectifier 108. For example, (1) the positive electrode terminal of the first backup capacitor 100 is electrically connected to the positive side output terminal of the rectifier 108, and (2) the negative electrode terminal of the first backup capacitor 100 is electrically connected to the negative side output terminal of the rectifier 108.

In FIG. 5, (1) the positive electrode terminal of the first backup capacitor 100 is electrically connected between the positive side output terminal of the rectifier 108 and the positive side 101A of the control power source output terminal 101. In addition, (2) the negative electrode terminal of the first backup capacitor 100 is electrically connected between the negative side output terminal of the rectifier 108 and the negative side 101B of the control power source output terminal 101.

According to the above configuration, the capacitor unit 11 includes the first backup capacitor 100 between the rectifier 108 and the control power source output terminal 101 which supplies power to the control circuit of the driver 20. Besides, the first backup capacitor 100 is charged by the output of the rectifier 108.

Therefore, the capacitor unit 11 has an effect of being capable of supplying the charging power of the first backup capacitor 100 to the control circuit of the driver 20 even when a sudden change in the input voltage such as an instantaneous voltage drop, an instantaneous power failure or the like caused by a lightning strike or the like occurs.

In addition, the capacitor unit 11 has an effect of being capable of taking measures for the driver 20 against a sudden change in the input voltage such as an instantaneous voltage drop, an instantaneous power failure or the like caused by a lightning strike or the like without changing the driver 20.

When a sudden change in the input voltage to the capacitor unit 11 occurs, the notification portion 200 notifies the outside that "a sudden change in the input voltage has occurred". The notification portion 200 is connected to the AC power source input terminal 106. When it is detected that the input voltage of the AC power source input to the AC power source input terminal 106 has suddenly changed, the notification portion 200 notifies the external device (for example, the controller 40 or the like) that "a sudden change in the input voltage has occurred".

Moreover, as described above, in the capacitor unit 11, the DC/DC power source converter module 105 is not essential, and when the voltage of the DC current output from the rectifier 108 is the desired voltage to be input to the control power source output terminal 101, voltage conversion is not required. In addition, an inverter circuit (a DC/AC inverter circuit) may be inserted between the first backup capacitor 100 and the control power source output terminal 101, and the control power source output terminal 101 supplies an AC current as the control power source to the driver 20.

Embodiment 3

Embodiment 3 of the present invention is described as following based on FIG. 6 and FIG. 7. Moreover, for convenience of description, members having the same functions as the members which have been described in the above embodiments are given the same symbols, and descriptions thereof are omitted. In order to facilitate understanding of the capacitor unit 12 (the power supply device) according to the present embodiment, first, an example of connection of the capacitor unit 12 to the driver 20 (a motor driving device) is described using FIG. 7.

(Example of Connection to Driver)

FIG. 7 is a diagram showing an example of connection of the capacitor unit 12 to the driver 20. FIG. 7 shows an example in which the controller 40 serving as a master device is connected to a plurality of slave devices (specifically, drivers 20A, 20B, and 20C) via the field network 60. Each of the drivers 20A, 20B, and 20C is powered by each of capacitor units 12A, 12B, and 12C. Each of the capacitor units 12A, 12B, and 12C is supplied with a three-phase AC power source of 200 V from outside.

Moreover, in the description of FIG. 7, the drivers 20A, 20B, and 20C are drivers in which suffixes "A", "B", and "C" are attached to the "driver 20" to distinguish each of the three "drivers 20". When it is not necessary to particularly distinguish each of the drivers 20A, 20B, and 20C, they are simply referred to as "the driver 20". Similarly, the capacitor units 12A, 12B, and 12C are capacitor units in which suffixes "A", "B", and "C" are attached to the "capacitor unit 12" to distinguish each of the three "capacitor units 12". When it is not necessary to particularly distinguish each of the capacitor units 12A, 12B, and 12C, they are simply referred to as "the capacitor unit 12".

As shown in FIG. 7, the capacitor unit 12 supplies a main circuit power source ("P-N" in FIG. 7) and a control power source ("DC 24 V" on the upper side of a paper plane in FIG. 7) to the driver 20 and backs up the main circuit power source and the control power source. In addition, the capacitor unit 12 supplies a brake power source ("DC 24 V (Brake)" on the lower side of the paper plane in FIG. 7) to the driver 20 and backs up the brake power source. In other words, the capacitor unit 12 performs three systems of power source output of the main circuit power source, the control power source, and the brake power source to the driver 20, and backs up the main circuit power source, the control power source, and the brake power source. The capacitor unit 12 supplies power to the brake control circuit of the driver 20 when a sudden change in the input voltage caused by a lightning strike or the like occurs, and thereby prevents a situation in which the driver 20 unintentionally brakes the motor 30. Furthermore, the capacitor unit 12 supports energy utilization for regeneration/powering.

Moreover, as described above, in the capacitor unit 12, the DC/DC power source converter module 105 is not essential, and when the voltage of the DC current output from the rectifier 104 is the desired voltage to be input to the control power source output terminal 101, voltage conversion is not required. In addition, an inverter circuit (a DC/AC inverter circuit) may be inserted between the first backup capacitor 100 and the control power source output terminal 101, and the control power source output terminal 101 supplies an AC current as the control power source to the driver 20.

(Outline of Capacitor Unit)

Next, the details of the capacitor unit 12 whose outline has been described above using FIG. 7 will be described using FIG. 6. Moreover, the capacitor unit 12 whose circuit configuration is illustrated in FIG. 6 differs from the capacitor unit 10 whose circuit configuration is illustrated in FIG. 1 in the following three points.

First, the capacitor unit 12 has a brake power source output terminal 111, supplies power (brake power source) to the brake control circuit of the driver 20 and backs up the brake power source. Specifically, in the capacitor unit 12 (the power supply device), (1) the positive electrode terminal of the first backup capacitor 100 is electrically connected between the positive side output terminal of the rectifier 104 and a positive side 111A of the brake power source output terminal 111 which is an output terminal for supplying power to the brake control circuit which "decelerates the motor 30 independently of the operation of the main circuit when a sudden change in the input voltage occurs", and (2) the negative electrode terminal of the first backup capacitor 100 is electrically connected between the negative side output terminal of the rectifier 104 and a negative side 111B of the brake power source output terminal 111. In other words, in the capacitor unit 12, the first backup capacitor 100 is inserted between the rectifier 104 and the brake power source output terminal 111 which supplies power to the brake control circuit which "decelerates the motor 30 independently of the operation of the main circuit when a sudden change in the input voltage occurs".

According to the above configuration, the capacitor unit 12 includes the first backup capacitor 100 between the rectifier 104 and the brake power source output terminal 111 (the output terminal) which supplies power to the brake control circuit which "decelerates the motor 30 independently of the operation of the main circuit when a sudden change in the input voltage occurs". Besides, when a sudden change in the input voltage caused by a lightning strike or the like occurs, the capacitor unit 12 supplies charging power of the first backup capacitor 100 to the brake control circuit which "decelerates the motor 30 independently of the operation of the main circuit when a sudden change in the input voltage occurs".

Here, when a sudden change in the input voltage caused by a lightning strike or the like occurs in a state that power source supply to the brake control circuit is not backed up, the brake control circuit decelerates the motor 30 independently of the operation of the main circuit of the driver 20. In addition, the brake control circuit may maintain a stop state of the motor 30 in which drive power is not supplied from the main circuit of the driver 20 during power interruption or the like.

However, for example, when the brake control circuit suddenly decelerates the motor 30 independently of the control of the motor 30 by the main circuit, an unexpected situation such as damage of work-pieces or the like which does not occur when the main circuit controls the motor 30 may occur.

On the other hand, the capacitor unit 12 backs up the power source supply to the brake control circuit when a sudden change in the input voltage caused by a lightning strike or the like occurs. Therefore, the power supply device has an effect of being capable of avoiding, even when a sudden change in the input voltage caused by a lightning strike or the like occurs, that the unexpected situation as described above occurs because the brake control circuit decelerates the motor independently of the operation of the main circuit.

Moreover, as described above, it is not essential for the capacitor unit 12 that the brake control circuit is built in the driver 20. The capacitor unit 12 may supply the brake power source to a circuit (a control circuit) or a device which exists independently of the driver 20 and controls "the brake which decelerates the motor 30 independently of the operation of the main circuit of the driver 20 when a sudden change in the input voltage occurs". The capacitor unit 12 may back up the brake power source of the circuit (the control circuit) or the device which exists independently of the driver 20 and controls "the brake which decelerates the motor 30 independently of the operation of the main circuit of the driver 20 when a sudden change in the input voltage occurs".

Second, the capacitor unit 12 includes a capacitor extension terminal 112, and is electrically connected in parallel to a capacitor unit 12 other than the host unit, and thereby an electric capacity of the second backup capacitor 109 of the host unit can be increased (artificially). That is, the capacitor unit 12 can use an electric capacity of a second backup capacitor 109 of a capacitor unit 12 other than the host unit.

Specifically, the capacitor unit 12 further includes the capacitor extension terminal 112 (connector) electrically connected to the second backup capacitor 109. Besides, the capacitor extension terminal 112 of the capacitor unit 12 can be connected to (1) a capacitor extension terminal 112 or (2) a main circuit power source output terminal 110 supplying power to the main circuit of the driver 20 of a capacitor unit 12 other than the host unit.

For example, a capacitor extension terminal 112 of the capacitor unit 12A can be connected to "a capacitor extension terminal 112 or a main circuit power source output terminal 110" of the capacitor unit 12B. Moreover, the capacitor extension terminal 112 of the capacitor unit 12A may be connected to "the capacitor extension terminal 112 or the main circuit power source output terminal 110" of the capacitor unit 12B by wire or directly.

Therefore, if (1) the capacitor extension terminal 112 or (2) the main circuit power source output terminal 110 supplying power to the main circuit of the driver 20 of the capacitor unit 12 other than the host unit is electrically connected in parallel to the capacitor extension terminal 112, the second backup capacitor 109 of the capacitor unit 12 other than the host unit and the second backup capacitor 109 of the host unit are electrically connected in parallel. That is, the capacitor unit 12 can use the electric capacity of the second backup capacitor 109 of the capacitor unit 12 other than the host unit in a manner that (1) the capacitor extension terminal 112 or (2) the main circuit power source output terminal 110 supplying power to the main circuit of the driver 20 of the capacitor unit 12 other than the host unit is electrically connected in parallel to the capacitor extension terminal 112. For example, the capacitor unit 12A uses an electric capacity of the second backup capacitor 109 of the capacitor unit 12B in a manner that "the capacitor extension terminal 112 or the main circuit power source output terminal 110" of the capacitor unit 12B is electrically connected in parallel to the capacitor extension terminal 112 of the capacitor unit 12A.

Therefore, the capacitor unit 12 has an effect of being capable of using, when the electric capacity of the second backup capacitor 109 of the host unit is not sufficient, the electric capacity of the second backup capacitor 109 of the capacitor unit 12 other than the host unit which is connected to the host unit in a manner that (1) the capacitor extension terminal 112 or (2) the main circuit power source output terminal 110 supplying power to the main circuit of the driver 20 of the capacitor unit 12 other than the host unit is electrically connected in parallel to the capacitor extension terminal 112.

(Notes on Capacitor)

Moreover, the capacitor unit 12 may further include a capacitor (not shown) as a component inside or outside a casing of the unit in order to increase the electric capacity of the second backup capacitor 109 of the unit. Besides, the electric capacity of the second backup capacitor 109 may be increased by connecting the capacitor added inside or outside the casing of the unit in parallel to the second backup capacitor 109.

In addition, each of the first backup capacitor 100 and the second backup capacitor 109 described above may be achieved by one capacitor (the capacitor component), or by two or more capacitors (capacitor components).

Third, in the capacitor unit 12, the first backup capacitor 100 and the second backup capacitor 109 in the capacitor unit 10 are electrically connected in parallel. Specifically, similarly with the capacitor unit 10, the capacitor unit 12 includes the second backup capacitor 109 which is connected between the positive side output terminal 110A and the negative side output terminal 110B of the main circuit power source output terminal 110 which supplies power to the main circuit of the driver 20. Besides, the positive electrode terminal of the first backup capacitor 100 is electrically connected to the positive electrode terminal of the second backup capacitor 109, and the negative electrode terminal of the first backup capacitor 100 is electrically connected to the negative electrode terminal of the second backup capacitor 109.

According to the above configuration, the capacitor unit 12 includes the second backup capacitor 109 which is connected between the positive side output terminal 110A and the negative side output terminal 110B of the main circuit power source output terminal 110 which supplies power to the main circuit of the driver 20. Besides, the positive electrode terminal of the first backup capacitor 100 of the capacitor unit 12 is electrically connected to the positive electrode terminal of the second backup capacitor 109, and the negative electrode terminal of the first backup capacitor 100 is electrically connected to the negative electrode terminal of the second backup capacitor 109. That is, in the capacitor unit 12, the first backup capacitor 100 and the second backup capacitor 109 are electrically connected in parallel.

Therefore, the capacitor unit 12 has an effect of being capable of supplying, when a sudden change in the input voltage occurs, charging power of the second backup capacitor 109 electrically connected in parallel to the first backup capacitor 100 to the control circuit of the driver 20.

(Details of Capacitor Unit)

FIG. 6 is a diagram showing a circuit configuration of the capacitor unit 12 according to Embodiment 3 of the present invention. Moreover, as described above, the capacitor unit 12 further includes the brake power source output terminal 111 and the capacitor extension terminal 112 in addition to the configuration of the capacitor unit 10. In addition, in the capacitor unit 12, the first backup capacitor 100 and the second backup capacitor 109 are electrically connected in parallel. Besides, a diode 113 is inserted between the first backup capacitor 100 and the second backup capacitor 109. Except for these configurations, the configurations of the capacitor unit 12 are the same as the configurations of the capacitor unit 10 and description of the configurations of the capacitor unit 12 which are the same as the capacitor unit 10 are omitted.

The brake power source output terminal 111 is connected to the DC/DC power source converter module 105, and the brake power source output terminal 111 supplies a DC current whose voltage has been adjusted by the DC/DC power source converter module 105 to the driver 20 as the brake power source. Here, the brake power source output terminal 111 is connected to the first backup capacitor 100 via the DC/DC power source converter module 105. When a sudden change in the input voltage occurs, the power charged into the first backup capacitor 100 by the output of the rectifier 108 is supplied to the brake power source output terminal 111. In other words, the first backup capacitor 100 is charged by the output of the rectifier 108 and (1) supplies the control power source to the control circuit of the driver 20 and (2) supplies the brake power source to the brake control circuit of the driver 20 by discharging when a sudden change in the input voltage occurs.

The capacitor extension terminal 112 is electrically connected to the second backup capacitor 109. Specifically, the positive side output terminal 110A of the main circuit power source output terminal 110 which supplies power to the main circuit of the driver 20 and a positive electrode 112A of the capacitor extension terminal 112 are respectively electrically connected to the positive electrode terminal of the second backup capacitor 109. In addition, the negative side output terminal 110B of the main circuit power source output terminal 110 which supplies power to the main circuit of the driver 20 and a negative electrode 112B of the capacitor extension terminal 112 are respectively electrically connected to the negative electrode terminal of the second backup capacitor 109.

Besides, (1) a positive electrode 112A of a capacitor extension terminal 112 or (2) a positive side output terminal 110A of a main circuit power source output terminal 110 supplying power to the main circuit of the driver 20 of a capacitor unit 12 other than the host unit is connected to the positive electrode 112A of the capacitor extension terminal 112. In addition, (1) a negative electrode 112B of a capacitor extension terminal 112 or (2) a negative side output terminal 110B of the main circuit power source output terminal 110 supplying power to the main circuit of the driver 20 of the capacitor unit 12 other than the host unit is connected to the negative electrode 112B of the capacitor extension terminal 112.

For example, the capacitor extension terminal 112 of the capacitor unit 12A and (1) the capacitor extension terminal 112 or (2) the main circuit power source output terminal 110 of the capacitor unit 12B can be electrically connected so as to electrically connect the capacitor unit 12A and the capacitor unit 12B in parallel. That is, the capacitor unit 12B can be added to the capacitor unit 12A.

When the capacitor unit 12A and the capacitor unit 12B are electrically connected in parallel, the second backup capacitor 109 of the capacitor unit 12A and the second backup capacitor 109 of the capacitor unit 12B are electrically connected in parallel.

As summarized above, the plurality of capacitor units 12 can be electrically connected in parallel via the respective capacitor extension terminals 112. In addition, each of the plurality of capacitor units 12 can be electrically connected in parallel by connecting the capacitor extension terminal 112 of the unit itself and the main circuit power source output terminal 110 of the capacitor unit 12 other than the host unit in parallel.

By electrically connecting the plurality of capacitor units 12 in parallel to each other, each of the plurality of capacitor units 12 can mutually use electric capacity of the second backup capacitors 109 of the capacitor units 12 other than the host unit electrically connected. That is, the capacitor unit 12 is electrically connected in parallel to the capacitor unit 12 other than the host unit via the capacitor extension terminal 112, and thereby the electric capacity of the second backup capacitor 109 of the unit itself can be increased artificially.

In the capacitor unit 12, the second backup capacitor 109 and the first backup capacitor 100 are connected in parallel via the diode 113. Specifically, the positive electrode terminal of the first backup capacitor 100 and the positive electrode terminal of the second backup capacitor 109 are electrically connected, and a positive electrode terminal of the diode 113 is inserted between the two. In addition, the negative electrode terminal of the first backup capacitor 100 and the negative electrode terminal of the second backup capacitor 109 are electrically connected, and a negative electrode terminal of the diode 113 is inserted between the two.

The diode 113 is inserted between the second backup capacitor 109 and the first backup capacitor 100 so that a current from the second backup capacitor 109 to the first backup capacitor 100 flows forward.

As described above, the capacitor unit 12 receives input of two systems of AC power sources (for example, a single-phase AC power source of 200 V and a three-phase AC power source of 200 V) and outputs three systems of DC power sources (for example, a DC control power source of 24 V, a DC brake power source of 24 V and a DC main circuit power source of 200 V). The capacitor unit 12 also backs up the three systems of DC power sources (specifically, the control power source, the brake power source, and the main circuit power source). That is, the capacitor unit 12 backs up the control power source and the brake power source by the first backup capacitor 100 and backs up the main circuit power source by the second backup capacitor 109.

(About Electric Capacity)

The capacitor unit 12 artificially increases the electric capacity of first backup capacitor 100 by having at least one of the following two configurations.

(Connection to Capacitor Unit Other than the Host Unit)

The capacitor unit 12 can be electrically connected in parallel to a capacitor unit 12 other than the host unit via the capacitor extension terminal 112. By electrically connecting the capacitor unit 12 in parallel to the capacitor unit 12 other than the host unit, the second backup capacitor 109 of the connected capacitor unit 12 other than the host unit and the second backup capacitor 109 of the unit itself are electrically connected in parallel.

Therefore, the capacitor unit 12 can use the electric capacity of the second backup capacitor 109 of the connected capacitor unit 12 other than the host unit by being electrically connected in parallel to the capacitor unit 12 other than the host unit. That is, the capacitor unit 12 can artificially increase the electric capacity of the second backup capacitor 109 of the unit itself by being electrically connected in parallel to the capacitor unit 12 other than the host unit.

(Connection to Another Capacitor in the Unit Itself)

In the capacitor unit 12, the first backup capacitor 100 and the second backup capacitor 109 are electrically connected in parallel, and thereby the electric capacity of the first backup capacitor 100 is artificially increased. That is, in the capacitor unit 12, the first backup capacitor 100 which charges the backup power of the control power source and the second backup capacitor 109 which charges the backup power of the main circuit power source are electrically connected in parallel. The electric capacity of the first backup capacitor 100 is artificially increased by electrically connecting the first backup capacitor 100 and the second backup capacitor 109 in parallel.

(About Brake Power Source)

The capacitor unit 12 backs up not only the control power source but also the brake power source by the first backup capacitor 100 by artificially increasing the electric capacity of the first backup capacitor 100.

(About Modification Example of Backup of Brake Power Source)

FIG. 6 shows the example in which the first backup capacitor 100 is inserted between the rectifier 104 and the brake power source output terminal 111 which supplies power to the brake control circuit. However, the configuration for backup of the brake power source is not limited to the configuration shown in FIG. 6.

Figure 8:
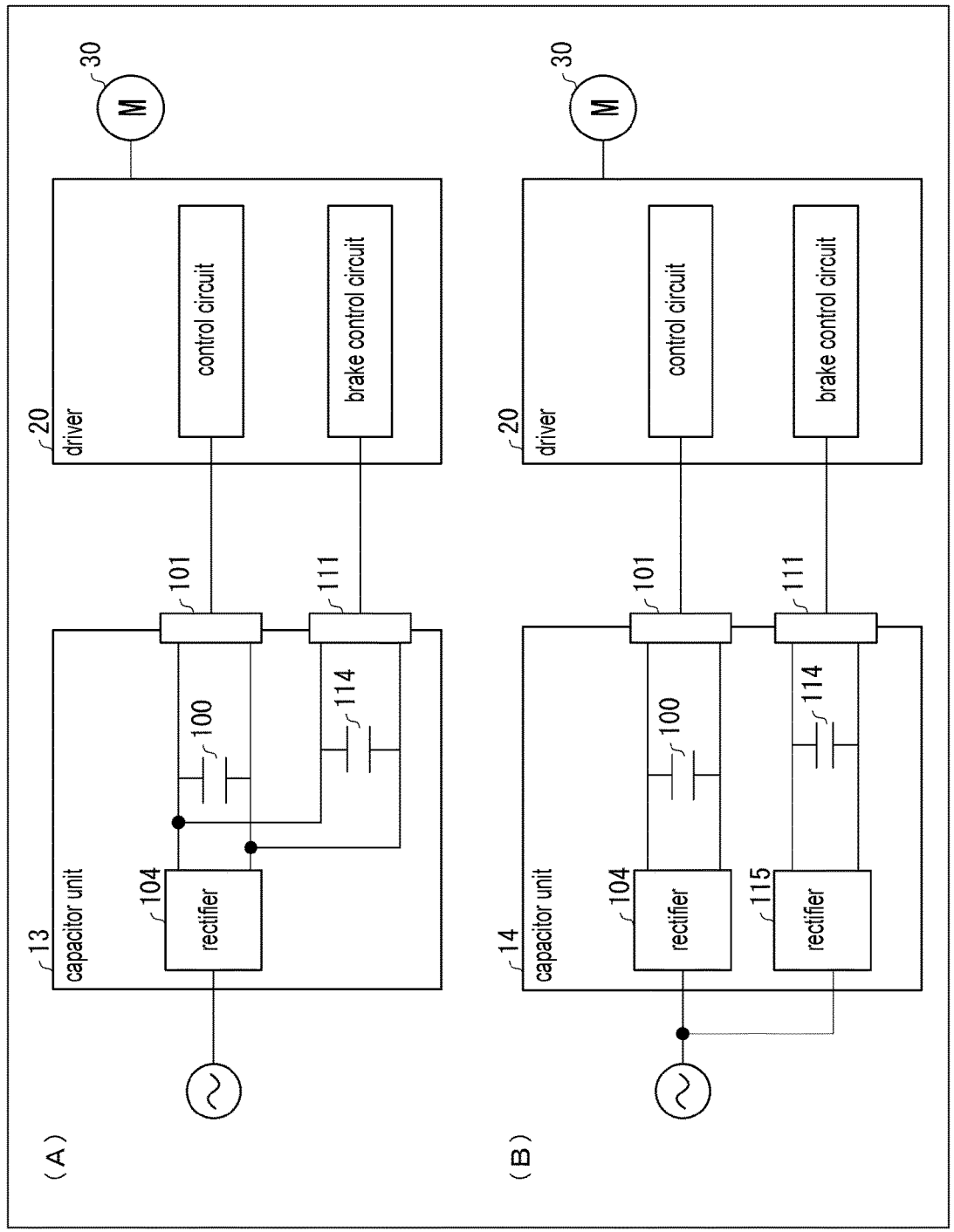
FIG. 8 is a diagram showing a main configuration of a capacitor unit for backup of a brake power source, the capacitor unit having a circuit configuration different from the circuit configuration shown in FIG. 6.

FIG. 8 is a diagram showing main configurations of a capacitor unit 13 ((A) of FIG. 8) and a capacitor unit 14 ((B) of FIG. 8) including circuit configurations different from the circuit configuration shown in FIG. 6 for backup of the brake power source. In (A) and (B) of FIG. 8, illustration of the same configurations as that in FIG. 6 is omitted.

The capacitor unit 13 illustrated in (A) of FIG. 8 backs up brake power source by a third backup capacitor 114 different from the first backup capacitor 100. That is, in the capacitor unit 13, the third backup capacitor 114 which is electrically connected in parallel to the first backup capacitor 100 backs up the brake power source.

The third backup capacitor 114 is inserted between the rectifier 104 and the brake power source output terminal 111 which supplies power to the brake control circuit. Specifically, in (A) of FIG. 8, a positive electrode terminal of the third backup capacitor 114 is connected between the positive side output terminal of the rectifier 104 and the positive side input terminal of the brake power source output terminal 111. In addition, a negative electrode terminal of the third backup capacitor 114 is connected between the negative side output terminal of the rectifier 104 and the negative side input terminal of the brake power source output terminal 111.

The third backup capacitor 114 is charged by the output of the rectifier 104 and supplies brake power source to the brake control circuit by discharging when a "sudden change in an input voltage" such as an instantaneous voltage drop, an instantaneous power failure or the like caused by a lightning strike or the like occurs. In other words, the third backup capacitor 114 supplies charging power to the brake control circuit when a sudden change in the input voltage caused by a lightning strike or the like occurs.

The capacitor unit 13 supplies the charging power of the third backup capacitor 114 to the brake control circuit as the brake power source when a sudden change in the input voltage caused by a lightning strike or the like occurs. That is, the capacitor unit 13 secures the brake power source of the brake control circuit and prevents the brake control circuit from decelerating (rapidly decelerating) the motor 30 independently of the main circuit of the driver 20 when a sudden change in the input voltage occurs.

Here, it is not essential for backup of the brake power source that the rectifier 104 for charging the first backup capacitor 100 is electrically connected to the third backup capacitor 114.

In the capacitor unit 14 illustrated in (B) of FIG. 8, a rectifier 115 different from the rectifier 104 which charges the first backup capacitor 100 charges the third backup capacitor 114.

The rectifier 115 is a rectification circuit which rectifies an alternating current input from an external AC power source. The third backup capacitor 114 is inserted between the rectifier 115 and the brake power source output terminal 111 which supplies power to the brake control circuit. Specifically, in (B) of FIG. 8, the positive electrode terminal of the third backup capacitor 114 is connected between a positive side output terminal of the rectifier 115 and the positive side input terminal of the brake power source output terminal 111. In addition, the negative electrode terminal of the third backup capacitor 114 is connected between a negative side output terminal of the rectifier 115 and the negative side input terminal of the brake power source output terminal 111. The third backup capacitor 114 is charged by output of the rectifier 115, and supplies brake power source to the brake control circuit by discharging when a "sudden change in input voltage" such as an instantaneous voltage drop, an instantaneous power failure or the like caused by a lightning strike or the like occurs.

(About Modification Example of DC/DC Power Source Converter Module)

In the example described in FIG. 1, an output voltage of the rectifier 104 is stepped down through the DC/DC power source comparator module 105 to obtain a control power source output. However, when it is not necessary to step down the output voltage of the rectifier 104, the DC/DC power source converter module 105 is not required. The present invention can also be applied to this configuration.

(About Modification Example of Control Power Source)

In the example described in FIG. 1, the control power source output is DC output. However, the present invention can also be applied when the control power source output is AC output. When the control power source output is AC output, an inverter circuit for converting a direct current into an alternating current may be included instead of the DC/DC power source converter module 105 of FIG. 1.

(Supplementary Information)

The power supply device according to one aspect of the present invention supplies power to a main circuit of a motor drive device supplying motor drive power to a motor and includes: a rectification circuit which rectifies an alternating current input from an external AC power source; and a control power source output terminal which supplies power to the control circuit of the motor drive device controlling the main circuit, wherein (1) a first backup capacitor is inserted between the rectification circuit and the control power source output terminal, and (2) the first backup capacitor is charged by output of the rectification circuit.

According to the above configuration, the power supply device includes the rectification circuit and the control power source output terminal which supplies power to the control circuit of the motor drive device, (1) a positive electrode terminal of the first backup capacitor is electrically connected between a positive side output terminal of the rectification circuit and a positive side of the control power source output terminal, and (2) a negative electrode terminal of the first backup capacitor is electrically connected between a negative side output terminal of the rectification circuit and a negative side of the control power source output terminal. In other words, the power supply device includes the first backup capacitor between the rectification circuit and the control power source output terminal which supplies power to the control circuit of the motor drive device. Besides, the first backup capacitor is charged by the output of the rectification circuit.

Therefore, the power supply device has an effect of being capable of supplying the charging power of the first backup capacitor to the control circuit of the motor drive device even when a sudden change in the input voltage such as an instantaneous voltage drop, an instantaneous power failure or the like caused by a lightning strike or the like occurs.

In addition, the power supply device has an effect of being capable of take measures for the motor drive device against a sudden change in the input voltage such as an instantaneous voltage drop, an instantaneous power failure or the like caused by a lightning strike or the like without changing the motor drive device.

For example, when changing various parameters used in the motor control device, or when cancelling an abnormality which occurs in the motor control device, it may be necessary to turn on the control power source again after temporarily turning off the control power source (reapply of the control power source of the motor control device). Here, when a backup mechanism for the control power source is arranged inside the motor control device, the control power source cannot be turned off until discharge of the backup mechanism in the motor control device is completed. However, by arranging the backup mechanism for the control power source in the power supply device instead of in the motor control device, the control power source can be easily turned off and reapplied. That is, without waiting for the discharge of the backup mechanism in the motor control device to be completed, the control power source can be easily turned off and reapplied only by disconnecting or reconnecting the electrical connection between the motor control device and the power supply device.

In addition, the motor control device may require a power source backup or may not require a power source backup depending on a usage situation or the like. By arranging the backup mechanism for the control power source externally (that is, arranging in the power supply device), the control power source can be backed up when the user needs. Furthermore, for a motor control device which originally did not require backup of the control power source, the control power source can be easily backed up by the power supply device even when the backup of the control power source is required thereafter.

In the power supply device according to one aspect of the present invention, (1) the positive electrode terminal of the first backup capacitor may be further electrically connected between the positive side output terminal of the rectification circuit and the positive side of the output terminal which supplies power to the brake control circuit which decelerates the motor independently of the operation of the main circuit when a sudden change in the input voltage occurs, and (2) the negative electrode terminal of the first backup capacitor may be further electrically connected between the negative side output terminal of the rectification circuit and the negative side of the output terminal which supplies power to the brake control circuit.

According to the above configuration, in the power supply device, (1) the positive electrode terminal of the first backup capacitor is further electrically connected between the positive side output terminal of the rectification circuit and the positive side of the output terminal which supplies power to the brake control circuit which decelerates the motor independently of the operation of the main circuit when a sudden change in the input voltage occurs, and (2) the negative electrode terminal of the first backup capacitor is further electrically connected between the negative side output terminal of the rectification circuit and the negative side of the output terminal which supplies power to the brake control circuit. In other words, the power supply device includes the first backup capacitor between the rectification circuit and the output terminal which supplies power to the brake control circuit. Besides, the power supply device supplies the charging power of the first backup capacitor to the brake control circuit when a sudden change in the input voltage caused by a lightning strike or the like occurs.

Here, in a state that the power source supply to the brake control circuit is not backed up, the brake control circuit decelerates the motor independently of the operation of the main circuit when a sudden change in the input voltage caused by a lightning strike or the like occurs. In addition, the brake control circuit may maintain a stop state of the motor in which the drive power is not supplied from the main circuit of the motor control device during power interruption or the like.

However, for example, when the brake control circuit suddenly decelerates the motor independently of the control of the motor by the main circuit, an unexpected situation such as damage of work-pieces or the like which does not occur when the main circuit controls the motor may occur.

On the other hand, the power supply device backs up the power source supply to the brake control circuit when a sudden change in the input voltage caused by a lightning strike or the like occurs. Therefore, the power supply device has an effect of being capable of avoiding that the unexpected situation as described above occurs because the brake control circuit decelerates the motor independently of the operation of the main circuit.

The power supply device according to one aspect of the present invention may further include a second backup capacitor which is connected between the positive side output terminal and the negative side output terminal which supply power to the main circuit of the motor drive device.

According to the configuration, the power supply device further includes the second backup capacitor which is connected between the positive side output terminal and the negative side output terminal which supply power to the main circuit of the motor drive device. Besides, the second backup capacitor is charged by power which is input to the output terminals which supply power to the main circuit of the motor drive device.

Therefore, the power supply device has an effect of being capable of supplying the charging power of the second backup capacitor to the main circuit of the motor drive device even when a sudden change in the input voltage such as an instantaneous voltage drop, an instantaneous power failure or the like caused by a lightning strike or the like occurs.

The power supply device according to one aspect of the present invention may further include a connector electrically connected to the second backup capacitor, and the connector can be connected to (1) a connector or (2) an output terminal which supplies power to the main circuit of the motor drive device of the power supply device other than the host device.

According to the configuration, the power supply device further includes the connector electrically connected to the second backup capacitor. Besides, the connector is connected to (1) the connector or (2) the output terminal which supplies power to the main circuit of the motor drive device of the power supply device other than the host unit.

Thus, when (1) the connector or (2) the output terminal which supplies power to the main circuit of the motor drive device of the power supply device other than the host device is electrically connected in parallel to the connector, the second backup capacitor of the power supply device other than the host device and the second backup capacitor of the host device are electrically connected in parallel. That is, the power supply device can use an electric capacity of the second backup capacitor of the power supply device other than the host device by electrically connecting (1) the connector or (2) the output terminal which supplies power to the main circuit of the motor drive device of the power supply device other than the host device in parallel to the connector.

Therefore, the power supply device has an effect of being capable of using, when the electric capacity of the second backup capacitor is insufficient, the electric capacity of the second backup capacitor of the power supply device other than the host device which is connected to the host device in a manner that (1) the connector or (2) the output terminal which supplies power to the main circuit of the motor drive device of the power supply device other than the host device is electrically connected in parallel to the connector.

In the power supply device according to one aspect of the present invention, the positive electrode terminal of the first backup capacitor may be electrically connected to the positive electrode terminal of the second backup capacitor, and the negative electrode terminal of the first backup capacitor may be electrically connected to the negative electrode terminal of the second backup capacitor.

According to the configuration, the positive electrode terminal of the first backup capacitor is electrically connected the positive electrode terminal of the second backup capacitor, and the negative electrode terminal of the first backup capacitor is electrically connected to the negative electrode terminal of the second backup capacitor. That is, in the power supply device, the first backup capacitor and the second backup capacitor are electrically connected in parallel.

Therefore, the power supply device has an effect of being capable of supplying, when a sudden change in the input voltage occurs, the charging power of the second backup capacitor which is electrically connected in parallel to the first backup capacitor to the control circuit of the motor drive device.

The power supply device according to one aspect of the present invention may notify the outside that a sudden change in the input voltage has occurred when a sudden change in the input voltage to the host device occurs.

According to the configuration, the power supply device notifies the outside that a sudden change in the input voltage has occurred when a sudden change in the input voltage to the host device occurs.

Therefore, the power supply device has an effect of being capable of notifying, when a sudden change in the input voltage to the host device occurs, an external controller or the like that a sudden change in the input voltage has occurred and making the controller or the like execute necessary processing at the time of "a sudden change of the input voltage". For example, when a sudden change in the input voltage to the host device occurs, the power supply device notifies the external controller that a sudden change in the input voltage has occurred. Then, the controller which has received this notification can, for example, stop the motor which is connected to each of the plurality of motor drive devices in synchronization with the plurality of motor drive devices.

The present invention is not limited to each embodiment described above, and various modifications can be made within the scope of the claims, and embodiments which are obtained by appropriately combining the technical means respectively disclosed in different embodiments are also included in the technical scope of the present invention.

What is claimed is:

1. A power supply device which supplies a power to a main circuit of a motor drive device, in which the main circuit supplies a motor drive power to a motor, the power supply device comprising:
    a first rectification circuit which rectifies a first alternating current input from an external AC power source;
    a second rectification circuit which rectifies a second alternating current input from the external AC power source;
    a control power source output terminal which supplies a power to a control circuit of the motor drive device, in which the control circuit controls the main circuit;
    a main circuit power source output terminal which supplies a power to the main circuit;
    a brake power source output terminal which supplies a power to a brake control circuit of the motor drive to decelerate the motor independently of an operation of the main circuit when a sudden change in input voltage occurs;
    a first backup capacitor which is inserted between first the rectification circuit and the control power source output terminal and is charged by an output of the first rectification circuit;
    a second backup capacitor which is inserted between the second rectification circuit and the main circuit power source output terminal and is charged by an output of the second rectification circuit; and
    a third backup capacitor which is inserted between the first rectification circuit and the brake power source output terminal and is charged by the output of the first rectification circuit.

2. The power supply device according to claim 1, further comprising a connector electrically connected to the second backup capacitor, wherein
    the connector is capable of being connected to a connector or a main circuit power source output terminal of an another power supply device.

3. The power supply device according to claim 2, wherein the positive electrode terminal of the first backup capacitor is electrically connected to a positive electrode terminal of the second backup capacitor, and the negative electrode terminal of the first backup capacitor is electrically connected to a negative electrode terminal of the second backup capacitor.

4. The power supply device according to claim 3, wherein when a sudden change in an input voltage to the power supply occurs, it is notified to an outside that the sudden change in the input voltage has occurred.

5. The power supply device according to claim 2, wherein when a sudden change in an input voltage to the power supply device occurs, it is notified to an outside that the sudden change in the input voltage has occurred.

6. The power supply device according to claim 1, wherein the positive electrode terminal of the first backup capacitor is electrically connected to a positive electrode terminal of the second backup capacitor, and the negative electrode terminal of the first backup capacitor is electrically connected to a negative electrode terminal of the second backup capacitor.

7. The power supply device according to claim 6, wherein when a sudden change in an input voltage to the power supply device occurs, it is notified to an outside that the sudden change in the input voltage has occurred.

8. The power supply device according to claim 1, wherein when a sudden change in an input voltage to the power supply device occurs, it is notified to an outside that the sudden change in the input voltage has occurred.

9. The power supply device according to claim 1, wherein when a sudden change in an input voltage to the power supply device occurs, it is notified to an outside that the sudden change in the input voltage has occurred.

10. A power supply device which supplies a power to a main circuit of a motor drive device, in which the main circuit supplies a motor drive power to a motor, the power supply device comprising:
   a first rectification circuit which rectifies a first alternating current input from an external AC power source;
   a second rectification circuit which rectifies a second alternating current input from the external AC power source;
   a third rectification circuit which rectifies the first alternating current input from the external AC power source;
   a control power source output terminal which supplies a power to a control circuit of the motor drive device, in which the control circuit controls the main circuit;
   a main circuit power source output terminal which supplies a power to the main circuit;
   a brake power source output terminal which supplies a power to a brake control circuit of the motor drive device to decelerate the motor independently of an operation of the main circuit when a sudden change in input voltage occurs;
   a first backup capacitor which is inserted between the first rectification circuit and the control power source, output terminal and is charged by an output of the first rectification circuit;
   a second backup capacitor which is inserted between the second rectification circuit and the main circuit power source output terminal and is charged by an output of the second rectification circuit; and
   a third backup capacitor which is inserted between the second rectification circuit and the brake power source output terminal and is charged by an output of the third rectification circuit.

11. The power supply device according to claim 10, further comprising a connector electrically connected to the second backup capacitor, wherein
   the connector is capable of being connected to a connector or a main circuit power source output terminal of an another power supply device.

12. The power supply device according to claim 11, wherein the positive electrode terminal of the first backup capacitor is electrically connected to a positive electrode terminal of the second backup capacitor, and the negative electrode terminal of the first backup capacitor is electrically connected to a negative electrode terminal of the second backup capacitor.

13. The power supply device according to claim 10, wherein when a sudden change in an input voltage to the power supply device occurs, it is notified to an outside that the sudden change in the input voltage has occurred.

14. The power supply device according to claim 10, wherein the positive electrode terminal of the first backup capacitor is electrically connected to a positive electrode terminal of the second backup capacitor, and the negative electrode terminal of the first backup capacitor is electrically connected to a negative electrode terminal of the second backup capacitor.

15. The power supply device according to claim 10, wherein when a sudden change in an input voltage to the power supply device occurs, it is notified to an outside that the sudden change in the input voltage has occurred.

* * * * *